US 10,477,513 B2

(12) United States Patent
Ly et al.

(10) Patent No.: US 10,477,513 B2
(45) Date of Patent: Nov. 12, 2019

(54) COOPERATIVE GROUP BROADCASTING OF ON-DEMAND SYSTEM INFORMATION

(71) Applicant: QUALCOMM Incorporated, San Diego, CA (US)

(72) Inventors: Hung Ly, San Diego, CA (US); Keiichi Kubota, San Diego, CA (US); Tingfang Ji, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 15/289,573

(22) Filed: Oct. 10, 2016

(65) Prior Publication Data

US 2017/0311285 A1    Oct. 26, 2017

Related U.S. Application Data

(60) Provisional application No. 62/327,359, filed on Apr. 25, 2016.

(51) Int. Cl.
*H04W 48/12* (2009.01)
*H04W 72/00* (2009.01)
(Continued)

(52) U.S. Cl.
CPC ......... *H04W 72/005* (2013.01); *H04W 48/14* (2013.01); *H04W 74/0833* (2013.01); *H04B 2001/6912* (2013.01); *H04W 48/12* (2013.01)

(58) Field of Classification Search
CPC .......... H04B 2001/6912; H04W 48/12; H04W 48/14; H04W 72/005; H04W 74/0833
See application file for complete search history.

(56) References Cited

U.S. PATENT DOCUMENTS 8,320,267 B2   11/2012   Wei et al.
9,407,409 B2    8/2016   Bhattad et al.
(Continued)

FOREIGN PATENT DOCUMENTS

EP         2 779 717 B1      6/2016
WO    WO-2008/044664 A1      4/2008
WO    WO-2014/129951 A1      8/2014

OTHER PUBLICATIONS

CATT: "Consideration on Higher Layer Procedures in 5G NR", 3GPP TSG-RAN WG2 Meeting #93bis, R2-162568, Apr. 2, 2016, XP051082464, Retrieved from the Internet: URL:http://www.3gpp.org/ftp/tsg_ran/WG2_RL2/TSGR2_93bis/Docs/, 3 pages.
(Continued)

*Primary Examiner* — Asad M Nawaz
*Assistant Examiner* — Zhaohui Yang
(74) *Attorney, Agent, or Firm* — Qualcomm IP Dept.; James Hunt Yancey, Jr.

(57) ABSTRACT

Aspects described herein include receiving, at a base station operating in a wireless communication network, at least one chirp signal including at least one system information block request bitmap that identifies one or more of a plurality of system information blocks corresponding to each of one or more system information requests, identifying the one or more system information requests, generating a message in response to the one or more system information requests, encoding at least the portion of the message based at least in part the at least one system information block request bitmap to define an encoded message; and transmitting, over a broadcast channel, the encoded message in response to the chirp signal. A user equipment may include aspects for transmitting the chirp signal and receiving the encoded message.

30 Claims, 10 Drawing Sheets

(51) Int. Cl.
*H04W 74/08* (2009.01)
*H04W 48/14* (2009.01)
*H04B 1/69* (2011.01)

(56) References Cited

U.S. PATENT DOCUMENTS

| | | |
|---|---|---|
| 2015/0065133 A1 | 3/2015 | Cui et al. |
| 2015/0098459 A1* | 4/2015 | Lee .................. H04W 48/14 370/338 |
| 2015/0201368 A1* | 7/2015 | Cudak .................. H04W 48/12 370/329 |
| 2016/0135148 A1 | 5/2016 | Novlan et al. |
| 2016/0234759 A1 | 8/2016 | Kubota et al. |
| 2016/0291123 A1* | 10/2016 | Van Puijenbroek .................. G01S 5/0205 |
| 2017/0251500 A1* | 8/2017 | Agiwal .................. H04W 4/06 |

OTHER PUBLICATIONS

International Search Report and Written Opinion—PCT/US2017/024253—ISA/EPO—dated Jun. 16, 2017. 17 pages.
Samsung: "Preliminary View on Initial Access in 5G," 3GPP TSG-RAN WG2 Meeting #93bis, R2-162300, Dubrovnik, Croatia, Apr. 4, 2016, XP051082676, Retrieved from the Internet: URL:http://www.3gpp.org/ftp/tsg_ran/WG2_RL2/TSGR2_93bis/Docs/, 3 pages.
Smee J., "Qualcomm 5g Vision and Design", 5G Vision and Design IEEE 5G Summit Silicon Valley, Nov. 16, 2015 (Nov. 16, 2015), XP055360363, 22 pages.

* cited by examiner

US 10,477,513 B2

COOPERATIVE GROUP BROADCASTING OF ON-DEMAND SYSTEM INFORMATION

CLAIM OF PRIORITY UNDER 35 U.S.C. § 119

The present Application for Patent claims priority to Provisional Application No. 62/327,359 entitled "COOPERATIVE GROUP BROADCASTING OF ON-DEMAND SYSTEM INFORMATION" filed Apr. 25, 2016, which is assigned to the assignee hereof and hereby expressly incorporated by reference herein for all purposes.

BACKGROUND

Aspects of the present disclosure relate generally to wireless communication networks, and more particularly, to cooperative group broadcasting on-demand system information in a wireless communication network.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

For example, for 5G communications technology and beyond, current network-centric media access control (MAC) layer technologies may not provide a desired level of resource utilization and/or efficiency because of the various associated signal broadcasts. For instance, these broadcasts consume power and may or may not be received or used by some or all of a cell's served user equipments (UEs). Thus, improvements in wireless communication network operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure describes a wireless communication network having a UE-centric (also referred to as a UE-centric) MAC layer, where in some aspects, both UEs and base station resources (e.g., power, bandwidth, processor use, etc.) are able to be conserved by limiting some signaling to occur on-demand. In particular, as will be discussed below in more detail, the present aspects relate UEs transmitting system information requests on an as-needed basis (e.g., on-demand), and a network entity (e.g., a base station) transmitting a broadcast response including the requested system information. As such, the broadcast of the system information may be received by a group of UEs requesting overlapping or identical system information.

In an aspect, a method of operating a base station for wireless communications is provided. The method includes receiving, at the base station operating in a wireless communication network having a user-centric medium access control layer, at least one chirp signal having one or more system information requests from at least one user equipment, wherein the at least one chirp signal includes at least one system information block request bitmap that identifies one or more of a plurality of system information blocks corresponding to each of the one or more system information requests. The method also includes identifying the one or more system information requests, generating a message in response to the one or more system information requests, encoding at least the portion of the message based at least in part on the at least one system information block request bitmap to define an encoded message, and transmitting, over a broadcast channel, the encoded message in response to the chirp signal.

In another aspect, an apparatus for wireless communications is provided. The apparatus includes a transceiver configured to receive at least one chirp signal having one or more system information requests from at least one user equipment, wherein the transceiver is operating in a wireless communication network having a user-centric medium access control layer, a memory having one or more instructions, and a processor in communication with the memory and the transceiver. The processor is configured to receive, via the transceiver, at least one chirp signal having one or more system information requests from at least one user equipment, wherein the at least one chirp signal includes at least one system information block request bitmap that identifies one or more of a plurality of system information blocks corresponding to each of the one or more system information requests. The processor is also configured to identify the one or more system information requests, generate a message in response to the one or more system information requests, encode at least the portion of the message based at least in part on the at least one system information block request bitmap to define an encoded message, and transmitting, via the transceiver, over a broadcast channel, the encoded message in response to the chirp signal.

In another aspect, an apparatus for wireless communications is provided. The apparatus includes means for receiving, at a base station operating in a wireless communication network having a user-centric medium access control layer, at least one chirp signal having one or more system information requests from at least one user equipment, wherein the at least one chirp signal includes at least one system information block request bitmap that identifies one or more of a plurality of system information blocks corresponding to each of the one or more system information requests. The apparatus also includes means for identifying the one or more system information requests, means for generating a message in response to the one or more system information requests, means for encoding at least the portion of the message based at least in part the at least one system information block request bitmap to define an encoded message, and means for transmitting, over a broadcast channel, the encoded message in response to the chirp signal.

In another aspect, an apparatus for wireless communications is provided. The apparatus includes means for receiving, at a base station operating in a wireless communication network having a user-centric medium access control layer, at least one chirp signal having one or more system information requests from at least one user equipment, wherein the at least one chirp signal includes at least one system information block request bitmap that identifies one or more of a plurality of system information blocks corresponding to each of the one or more system information requests. The apparatus also includes means for identifying the one or more system information requests, means for generating a message in response to the one or more system information requests, means for encoding at least the portion of the message based at least in part the at least one system information block request bitmap to define an encoded message, and means for transmitting, over a broadcast channel, the encoded message in response to the chirp signal.

In another aspect, a computer-readable medium including code executable for operating a base station for wireless communications is provided. The code includes code for receiving, at the base station operating in a wireless communication network having a user-centric medium access control layer, at least one chirp signal having one or more system information requests from at least one user equipment, wherein the at least one chirp signal includes at least one system information block request bitmap that identifies one or more of a plurality of system information blocks corresponding to each of the one or more system information requests. The code also includes code for identifying the one or more system information requests, code for generating a message in response to the one or more system information requests, code for encoding at least the portion of the message based at least in part the at least one system information block request bitmap to define an encoded message, and code for transmitting, over a broadcast channel, the encoded message in response to the chirp signal is provided.

In another aspect, a method of a user equipment to communicate with a network entity is provided. The method includes detecting, by the user equipment operating in a wireless communication network having a user-centric medium access control layer, presence of a trigger event to request one or more sets of system information, and generating a chirp signal that includes one or more system information requests corresponding to the trigger event to request one or more sets of system information, wherein the chirp signal includes at least one system information block request bitmap that identifies one or more of a plurality of system information blocks corresponding to each of the one or more system information requests. The method also includes transmitting the chirp signal to a base station, receiving, via a broadcast channel, an encoded message in response to the chirp signal, and decoding the encoded message based at least in part on the at least one system information block request bitmap.

In another aspect, an apparatus for wireless communications is provided that includes a transceiver having a receiver and a transmitter respectively for receiving and transmitting wireless signals in a wireless communication network having a user-centric medium access control layer, a memory having one or more instructions, and a processor in communication with the memory and the transceiver. The processor is configured to detect presence of a trigger event to request one or more sets of system information, and generate a chirp signal that includes one or more system information requests corresponding to the trigger event to request one or more sets of system information, wherein the chirp signal includes at least one system information block request bitmap that identifies one or more of a plurality of system information blocks corresponding to each of the one or more system information requests. The processor is also configured to transmit, via the transceiver, the chirp signal to a base station, receive, via the transceiver over a broadcast channel, an encoded message in response to the chirp signal, and decoding the encoded message based at least in part on the at least one system information block request bitmap.

In another aspect, an apparatus for wireless communications is provided. The apparatus includes means for detecting, by the user equipment operating in a wireless communication network having a user-centric medium access control layer, presence of a trigger event to request one or more sets of system information, and means for generating a chirp signal that includes one or more system information requests corresponding to the trigger event to request one or more sets of system information, wherein the chirp signal includes at least one system information block request bitmap that identifies one or more of a plurality of system information blocks corresponding to each of the one or more system information requests. The apparatus also includes means for transmitting the chirp signal to a base station, means for receiving, via a broadcast channel, an encoded message in response to the chirp signal, and means for decoding the encoded message based at least in part on the at least one system information block request bitmap.

In another aspect, a computer-readable medium including code executable for operating a user equipment to communicate with a network entity is provided. The code includes code for detecting, by the user equipment operating in a wireless communication network having a user-centric medium access control layer, presence of a trigger event to request one or more sets of system information, and code for generating a chirp signal that includes one or more system information requests corresponding to the trigger event to request one or more sets of system information, wherein the chirp signal includes at least one system information block request bitmap that identifies one or more of a plurality of system information blocks corresponding to each of the one or more system information requests. The code also includes code for transmitting the chirp signal to a base station, code for receiving, via a broadcast channel, an encoded message in response to the chirp signal, and code for decoding the encoded message based at least in part on the at least one system information block request bitmap.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
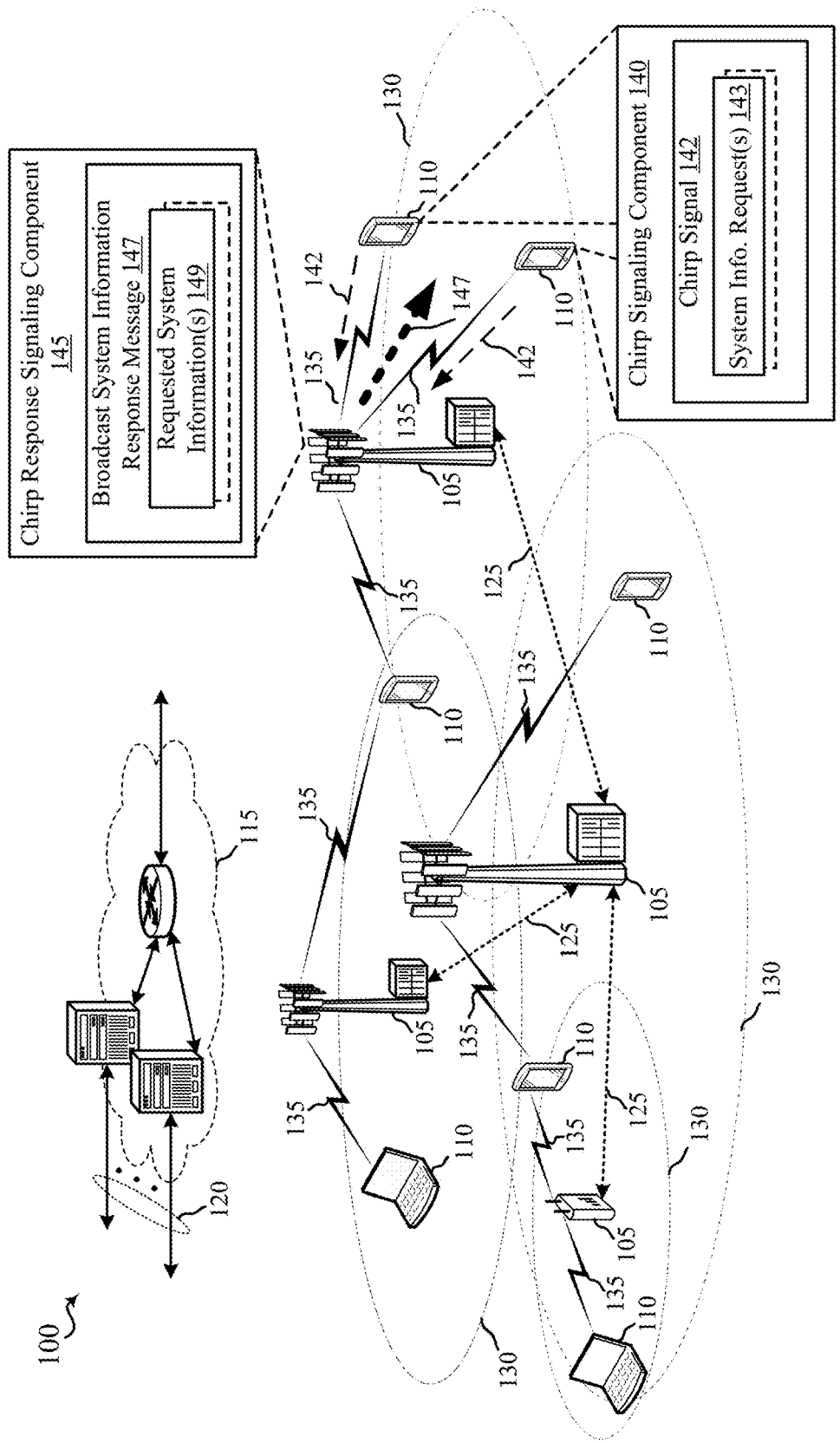
FIG. 1 is a schematic diagram of a wireless communication network including at least one user equipment (UE) having a chirp signaling component configured to transmit, according to one aspect, a chirp signal including one or more system information requests to a base station.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The described features generally relate to a wireless communication network having a user equipment (UE)-centric media access control (MAC) layer. As described in the present disclosure, in a wireless communication network having a UE-centric MAC layer, base stations and/or other network nodes may forego periodic broadcast of system information, some cell-specific reference signals, and/or the like, typically associated with a network-centric MAC layer. Instead, a wireless communication network having a UE-centric MAC layer may transmit system information upon request by a UE, e.g., "on-demand." This may also be advantageous, in some respects, because the periodic broadcast of system information and cell-specific information otherwise performed by a base station can contribute significantly to the power consumption of the base station, utilization of communication resources by the base station, etc. In addition, the UE might not need all system information, and the UE may wish to request only a subset of system information blocks. In this case, for example, the network can send the requested system information to the UE without necessarily sending other or all system information. This can result in less power consumption at the base station and UE (e.g., as the UE need not decode all of the system information including system information it may not need), conserving of processing and communication resources by not transmitting/receiving all system information, etc. In particular, benefits of on-demand system information may include, but are not limited to: from a UE perspective, the UE decodes what it has requested, which may result in possibly smaller payload transmission, receiving, and decoding, and thus more power efficiency; and, from a network perspective, the network can deliver a smaller system information payload, which may conserve communication/network resources.

In UE-centric MAC layer configurations, for example, the requested system information can be unicast to the UE upon request. For example, a UE may transmit a signal to contact the wireless communication network, which may be based on detecting one or more broadcast signals related to synchronizing communications with the wireless communication network. This signal transmitted by the UE to contact the wireless communication network may be referred to herein as a chirp signal. In an example, the UE may transmit the chirp signal for one or more purposes, such as to request some set of system information, establish a communication with the network, initiate a random access procedure when the UE has data to transmit to the network, support mobility tracking or handover when the UE is moving through the network, etc. Where the chirp signal is sent to request some set of system information, the chirp signal may contain one or more system information requests, e.g., one or more requests for different system information blocks (SIBs). Also, the chirp signal may include one or more of a random access sequence to avoid collisions with other chirp signals from other UEs, and a chirp message that may contain the system information requests and/or other corresponding supplemental information. Also, in some cases, the chirp message could be scrambled by the random access sequence to provide the chirp signal with a level of security or privacy.

The unicast transmission of the requested system information by the base station to different ones of a group of UEs may be inefficient, however, such as where some or all of the group of UEs are requesting similar or the same system information. For instance, a group of UEs within a zone (e.g., a group of cells having the same frequency, timing, synchronization, etc., that allow a network to control handover of the UE from one cell to another in a manner that is transparent to the UE) might request an overlapping subset or the same subset of system information. As a result, the separate unicast delivery of the system information to different ones of the group of UEs may require duplicate use of network resources for the same purpose.

As such, according to the present aspects, a network entity such as a base station may be configured to cooperatively broadcast the requested (e.g., on-demand) system information (also referred to as one or more SIBs-on-Demand) in response to a single chirp signal (e.g., in a format or with an indicator associated with a broadcast response) to at least one UE. Moreover, such broadcast system information may also be received by a group of UEs requesting the overlapping or the identical system information.

The present aspects may have one or more of the following benefits:

(i) the network could broadcast the one or more SIBs-on-Demand to a group of UEs, and thus there may be no need to send the same SIB-on-Demand separately to individual UEs (e.g., via unicast) in response to each UE request; this could simplify the network implementation as well as save the network resources; and (ii) one or more UEs could achieve a cooperation gain; in other words, a UE could decode the broadcast SIB-on-Demand even though the network has not yet successfully decoded the system information request sent by the UE; this is possible as long as the network successfully receives and decodes at least one system information request for the SIB from at least one UE in the group; also, the cooperative gain could save both UE and network power consumption; and, the procedure described herein may be transparent to all UEs and the network, e.g., essentially the same system information request and SIB-on-demand response may be used as in the unicast case.

Additionally, the present aspects may be beneficial, at least, in a use case where a group of two or more user equipments are moving in a similar manner. For instance, a group of user equipments in a same vehicle (e.g., car, bus, train, boat, plane, etc.) may have similar mobility tracking-related and/or handover-related system information requests because they are moving into and out of different zones at substantially similar times. As such, a base station configured as described herein to cooperatively broadcast the requested (e.g., on-demand) system information to all or a subset of such groups of UEs moving together provides enhanced network efficiency by possibly eliminating setup of separate unicast connections to transmit the same system information to one or more UEs in the groups of UEs. A further benefit in this scenario may be experienced by at least some of the UEs, e.g., one or more lagging (with respect to moving into or out of a zone) UEs, which are able to take advantage of earlier system information requests by one or more leading UEs, as the lagging UEs may be able to receive and decode the broadcast SIB-on-demand already requested by the leading UEs.

In an example, though the techniques relating to the broadcast system information (e.g., one or more SIBs-on-Demand) described herein may be primarily associated with a radio resource control (RRC)-common state of operation of UE, such techniques may be additionally or alternatively used in different states of the UE. For example, in 5G, at least three states may be defined for a UE: RRC-idle, such as when the UE is first powered up; RRC-common (also referred to as RRC-inactive), such as when the UE has camped on a cell of a base station but is inactive and periodically wakes up to monitor for paging signals from the base station; and, RRC-dedicated (also referred to as RRC-connected or RRC-connected-active), such as when the UE has established one or more dedicated communication channels with the cell of the base station such that the UE may be transmitting or receiving data.

The techniques described herein could be applicable to any of these states. For instance, in the RRC-common state, the techniques and formats of the chirp signal and corresponding chirp response disclosed herein may be used to request and provide system information, respectively, or to support mobility tracking. Also, the techniques described herein may be applicable to RRC-dedicated state, such as when more than one UE performs handover of an active call from a common serving zone to a common target zone. Additionally, the techniques described herein may be applicable to RRC-idle state, such as when more than one UE wakes up at a substantially similar time in a same zone.

Additional features of the present aspects are described in more detail below with respect to FIGS. 1-12.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1× EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 having a chirp signaling component 140 configured to generate and cause transmission of a chirp signal 142 that includes, at least, one or more system information requests 143 that identify one or more sets of system information, e.g., one or more system information blocks (SIBs), that UE 110 would like to receive in an "on-demand" fashion (e.g., as opposed to the typical, periodic broadcast of such system information as is done in prior solutions). Additionally, in an aspect, chirp signal 142 that includes one or more system information requests 143 may optionally include an indicator, or be in a format that indicates, that a broadcast response is expected by the respective UE 110. Further, wireless communication network 100 includes at least one base station 105 having a chirp response signaling component 145 configured to generate and cause transmission, via a broadcast channel, of a broadcast system information response message 147 that includes, at least, one or more requested system information(s) 149, e.g., one or more SIBs, in response to receiving chirp signal 142. For example, the broadcast system information response message 147 may include one or more (e.g., a series of) messages or signals, broadcast from the base station 105, that includes the requested system information(s) 149.

Additionally, in an aspect, base station 105 may determine to broadcast the one or more requested system information 149 based on receiving chirp signal 142. The chirp signal 142 may include one or more system information requests 143 that may optionally include the indicator. Alternatively, the chirp signal 142 may be in a format that indicates that a broadcast response is expected by the respective UE 110. Although base station 105 may send broadcast system information response message 147 in response to a single chirp signal 142 received from a single UE 110, base station 105 may also receive more than one chirp signal 142 from more than one UE 110, where the different chirp messages 142 include the same or some overlapping set of system information requests 143. In this case, a single broadcast system information response message 147 (or series of messages/signal(s) that include the requested system information(s) 149) transmitted via a broadcast channel may be received by more than one UE 110, such that the single broadcast system information response message 147 can provide one or more requested system information(s) 149 to a plurality of UEs (e.g., regardless of whether a request for the system information(s) 149 was received by all of the plurality of UEs). Transmitting the single broadcast system information response message 147 (or messages/signals) in this regard may decrease network resources utilized for sending the response to multiple chirp signals 142, as opposed to where a response message (or messages/signals) are transmitted for each respective chirp signal.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include a Long Term Evolution (LTE) or LTE-Advanced (LTE-A) technology network. The wireless communication network 100 may also be a next generation technology network, such as a 5G wireless communication network. In LTE/LTE-A networks, the term evolved node B (eNB) may be generally used to describe the base stations 105, while the term UE may be generally used to describe the UEs 110. The wireless communication network 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers.

Figure 2:
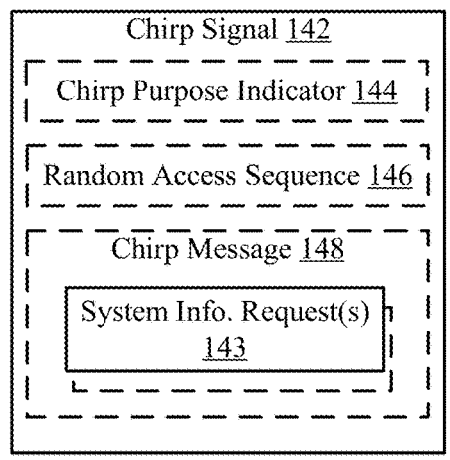
FIG. 2 is a schematic diagram of an aspect of a format of the chirp signal including one or more system information requests, and, optionally, one or more of a chirp purpose indicator, a random access sequence, or a chirp message.
Figure 3:
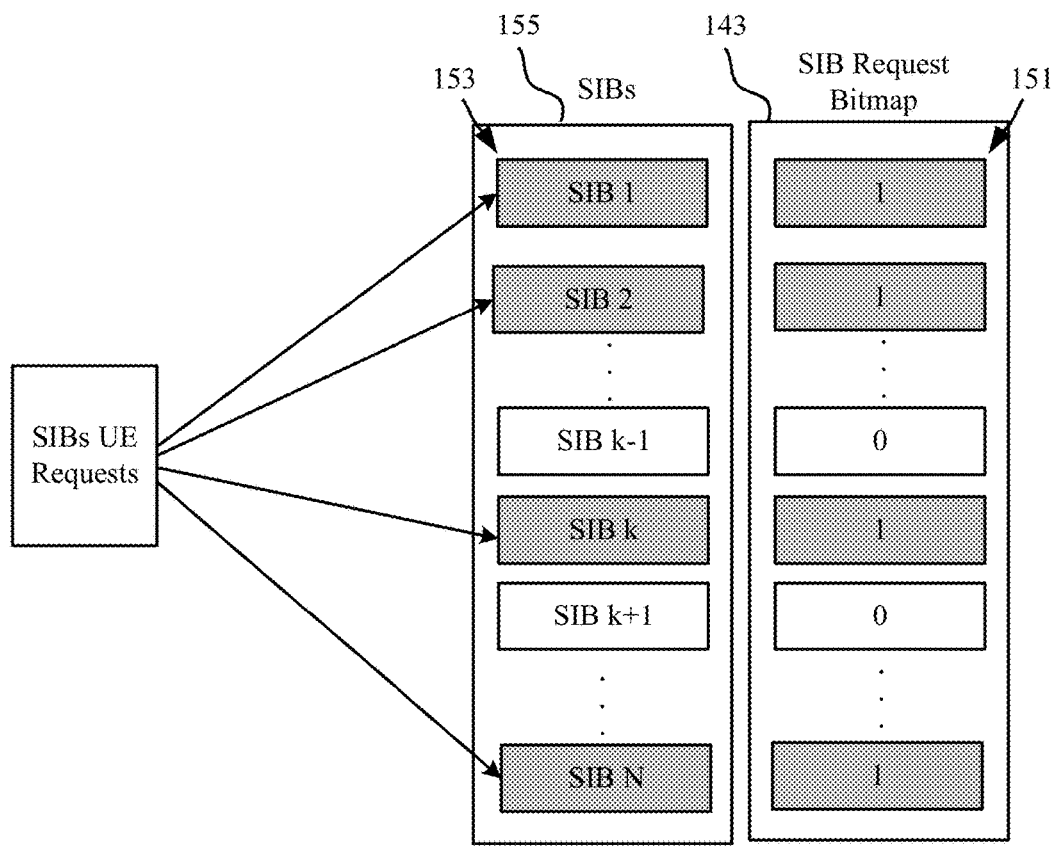
FIG. 3 is a schematic diagram of an aspect of a system information block (SIB) bitmap that may be included in some aspects of the chirp message, wherein the SIB bitmap includes values indicating whether or not a corresponding SIB is being requested.

Referring now to FIGS. 1, 2 and 3, as mentioned above, in accordance with the present disclosure, in an implementation of the wireless communication network 100 having a UE-centric MAC layer, UE 110 operating chirp signaling component 140 may be configured to transmit chirp signal 142 that includes one or more system information request(s) 143 and, optionally, one or more other contents, such as a chirp purpose indicator 144, a random access sequence 146, a chirp message 148, etc. Chirp purpose indicator 144 may be a set of specially-formatted data to give a receiving network entity, such as base station 105, an indication as to why UE 110 is sending chirp signal 142, e.g., an early indication as to the purpose or function associated with chirp message 148. In other words, chirp purpose indicator 144 is different from, and may have a smaller size than, chirp message 148. Moreover, as noted above, chirp purpose indicator 144 may enable a more efficient operation of base station 105, as it may allow base station 105 to know the format and content of the received chirp signal 142 (which may vary depending on the chirp purpose), and/or as it may allow base station 105 to reserve resources and/or initiate a response to chirp signal 142 prior to decoding and reading one or more additional portions of chirp signal 142. Random access sequence 146 may include, but is not limited to, one of a plurality of sets of specific bit patterns or signatures that are used to differentiate requests coming from different UEs. Chirp message 148 may include, but is not limited to, a set of bits associated with a purpose or function of chirp signal 142, such as, but not limited to, an identification of one or more SIBs for requesting system information, an amount of data waiting for transmission reported in association with initiating a random access procedure, global zone identifier (ID) group information (e.g., an identifier of a set of cells organized into a zone that each operate on a same frequency, timing, etc., to allow network-controlled handover without UE involvement) or other mobility-related or handover-related information for supporting mobility tracking or handover, etc. Optionally, chirp message 148 may additionally include data and/or a set of bits that represent an identity of UE 110.

In particular, some aspects may specifically relate to an implementation where chirp message 148 includes at least the one or more system information requests 143, which may include one or more indicators or identifiers (such as, but not limited to, data or one or more bits or sets of bits of different values) of a corresponding one or more sets of system information, e.g., requested system information 149 or SIB-on-demand. For example, the inclusion of one or more of chirp purpose indicator 144, random access sequence 146, and/or chirp message 148 may be optional depending on the complexity and/or efficiency desired in a particular implementation, as described herein.

For example, specifically referring to FIG. 3, one suitable example (but not limited hereto) of the one or more system information requests 143 may include a SIB request bitmap having a set of bits 151 with respective values that indicate whether a corresponding SIB 153 from a set of available SIBs 155 is being requested by UE 110. In this example of FIG. 3, the number N is the total number of available SIBs 153, where N may be any positive integer value, and k is a particular SIB (e.g., an index of a particular SIB) within the N SIBs. For instance, in this example, a position of each of the set of bits 151 in the SIB request bitmap corresponds to one of the plurality of SIBs 153 in the set of available SIBs 155, e.g., a bit in first position in the SIB request bitmap may correspond to a first SIB, a bit in a second position in the SIB request bitmap may correspond to a second SIB, etc. Further, in this example, a bit value of "1" may indicate a request by UE 110 for base station 105 to provide the corresponding SIB information, whereas a value of "0" may indicate that the corresponding SIB information is not being requested. In other words, as in this example, UE 110 can set the first, second, kth, and Nth bits of the SIB request bitmap to a value of "1," while the other bits would have a value of "0," to request SIB1, SIB2, SIB k, and SIB N, which respectively correspond to a first bit, a second bit, a kth bit, and an Nth bit in the SIB request bit map. The illustrated implementation of one or more system information requests 143 in the form of a SIB request bitmap is but one example implementation of a "SIB-on-Demand request" and other formats and/or data may be utilized to signal respective requested SIBs to base station 105.

In addition, in an example, the one or more system information requests 143, such as in the form of SIB request bitmap, as transmitted by a particular UE 110 may be based on a capability of the particular UE 110. For instance, a UE 110 transmitting the one or more system information requests 143 may have a capability to receive and process the corresponding system information that is received based on the system information request(s) 143. All UEs 110 may not have the capability to receive and/or process the corresponding system information. Thus, utilizing the SIB request bitmap allows a given UE to indicate the system information it would like to receive, which can conserve processing and/or communication resources used by the corresponding access point 105 in delivering the relevant system information (e.g., as opposed to necessarily all system information).

Referring to FIGS. 4-7, UE 110 executing chirp signaling component 140 may utilize any one of a number of different formats for generating chirp signal 142 including one or more system information requests 143, and/or chirp purpose indicator 144, and/or random access sequence 146, and/or chirp message 148.

Figure 4:
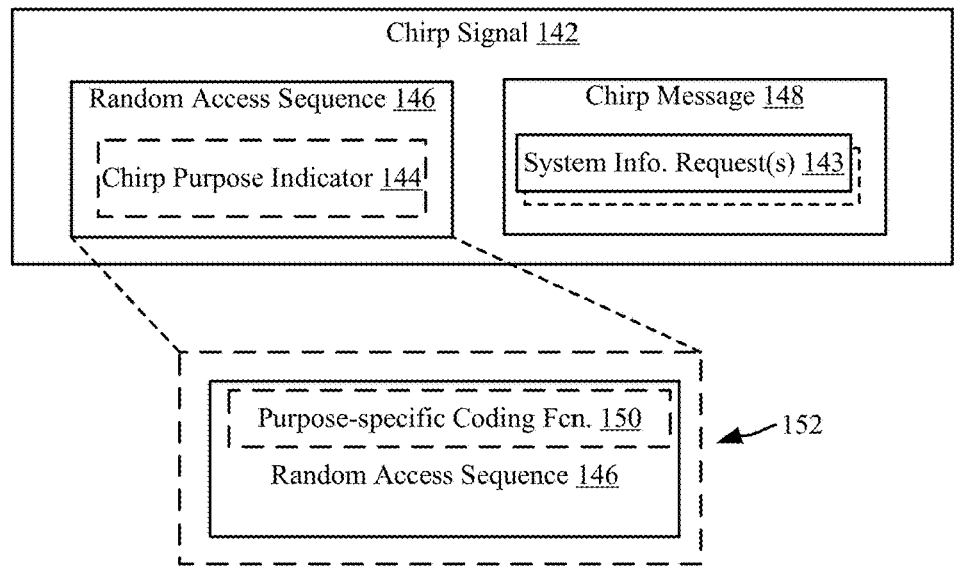
FIG. 4 is a schematic diagram of an aspect of a chirp signal having a chirp message, including one or more system information requests, a random access sequence including the chirp purpose indicator, and a corresponding example implementation of the same.
Figure 5:
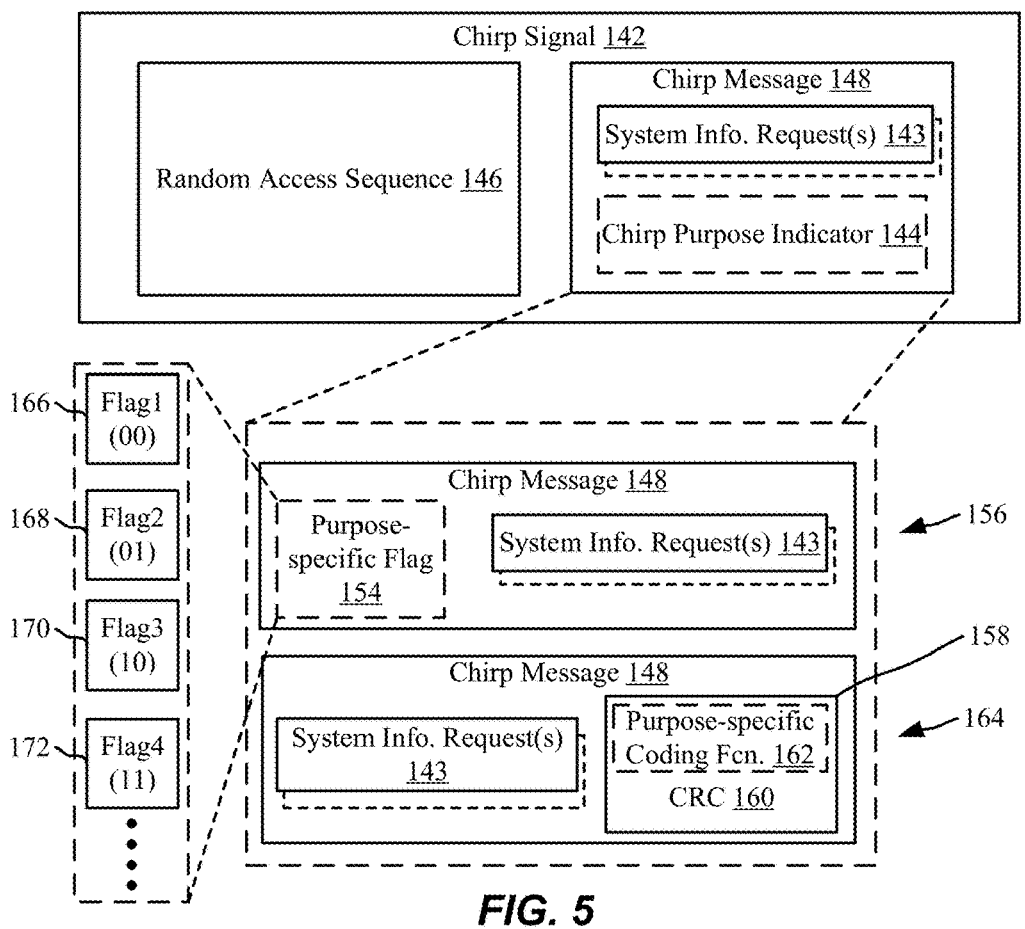
FIG. 5 is a schematic diagram of an aspect of a chirp signal having a random access sequence and a chirp message including one or more system information requests and also including the chirp purpose indicator, and corresponding example implementations of the same.

Referring specifically to FIGS. 4 and 5, as opposed to being generally included within chirp signal 142 as illustrated in FIG. 1, one or more system information requests 143 may be included within chirp message 148. Also, chirp purpose indicator 144 may in some cases be generated as a part of or accompanying random access sequence 146 as in FIG. 4, or in other cases be generated as part of or accompanying chirp message 148 as in FIG. 5.

In FIG. 4, for instance, in one example that should not be construed as limiting, chirp purpose indicator 144 may be generated as a part of random access sequence 146 by encoding random access sequence 146 with a purpose-specific coding function 150 to generate encoded random access sequence 152. In an aspect, purpose-specific coding function 150 may vary in a manner known to both UE 110 and base station 105 and in a manner that is dependent upon the corresponding chirp purpose. Purpose-specific coding function 150 may include, but is not limited to, any type of scrambling code, coding scheme, function, encryption algorithm, etc., that may be reversibly applied to random access sequence 146, and that is known and/or stored by both UE 110 and base station 105. In other words, purpose-specific coding function 150 includes a purpose-specific encoding function and a corresponding purpose-specific decoding function. As such, applying the purpose-specific encoding function portion of purpose-specific coding function 150 to random access sequence 146 results in encoded random access sequence 152, and applying the purpose-specific decoding function portion of purpose-specific coding function 150 to random access sequence 146 results in decoding encoded random access sequence 152 and hence results in the original random access sequence 146.

In an aspect, UE 110 may select random access sequence 146 from among a plurality of random access sequences known to both UE 110 and base station 105, where different sets of the plurality of random access sequences may be grouped to correspond to different chirp purposes (e.g., a first set associated with initiating a random access procedure, a second set associated with supporting mobility tracking or handover, a third set associated with requesting system information, etc.). Alternatively, or in addition, each of the plurality of random access sequences may have a corresponding random access sequence index value, which can be used to vary purpose-specific coding function 150 in a manner that can be correlated to the chirp purpose. For instance, in example that should not be construed as limiting, purpose-specific coding function 150 may include a scrambling sequence, and the random access sequence index value may be used to seed the scrambling sequence to obtain a seeded scrambling sequence, which may be known to both UE 110 and base station 105. As such, when base station 105 receives encoded random access sequence 152 and decodes it using a known seeded scrambling sequence to obtain a known random access sequence 146, then base station 105 can correlate the respective known random access sequence 146 to a respective chirp purpose based on the known grouping with which the known random access sequence 146 corresponds. Thus, random access sequence 146 encoded by a respective purpose-specific coding function 150 may be utilized to indicate a purpose of chirp signal 142. In one example, the random access sequence 146 may also be referred to as a chirp preamble.

In FIG. 5, using examples that should not be construed as limiting, chirp purpose indicator 144 may be generated as a part of chirp message 148. For example, in an aspect, chirp message 148 may include a purpose-specific flag 154 to define a purpose-specific flagged chirp message 156. Also, in another example, a purpose-specific encoded cyclic redundancy check (CRC) message 158 (e.g., a CRC message 160 encoded with a purpose-specific coding function 162) may be added to chirp message 148 to define a purpose-specific encoded CRC chirp message 164.

In an aspect, purpose-specific flag 154 may be, but is not limited to, a field containing one or more bits, where different values of the one or more bits correspond to different chirp purposes (e.g., to request system information, to initiate a random access procedure, or to support mobility tracking, etc.), as can be known by both UE 110 and base station 105. As such, upon receiving purpose-specific flagged chirp message 156 and decoding purpose-specific flag 154, base station 105 may correlate the value of purpose-specific flag 154 with a respective chirp purpose.

For instance, in one example that should not be construed as limiting, purpose-specific flag 154 may be a two bit field. In a case where the chirp purpose may include to initiate a random access procedure, or to support mobility tracking, or to request system information (e.g., including a request associated with a unicast response or a broadcast response), there may be 4 different flag values (Flag1 166, Flag2 168, Flag 3 170, and Flag4 172). A non-limiting example of the values of purpose-specific flag 154 and the chirp purposes may be as follows:

TABLE 1

Example Purpose-specific Flag values for different Chirp Purposes

| Chirp Purpose | Example Bits Values of Purpose-specific Flag 154 |
|---|---|
| Random access | <0, 0> 166 |
| Mobility tracking | <0, 1> 168 |
| System Information request (associated with a unicast response) | <1, 0> 170 |
| System Information request (associated with a broadcast response) | <1, 1> 172 |

As noted above, UE 110 may send chirp signal 142 to request system information, and in some cases the chirp signal 142 may be formatted such that the response from base station 105 is sent back to UE 110 via a unicast channel, whereas in other cases the response from base station 105 is sent back to UE 110 via a broadcast channel, e.g., when one or more than one UE requests the same or similar system information. The process of sending chirp signal 142 and receiving the broadcast system information response message 147 from the network, e.g., base station 105, can be transparent to the UEs 110, i.e., UE 110 does not need to know if other UEs request the same subset of system information blocks or not. More details about these formats are discussed below.

In an aspect, purpose-specific coding function 162 may include, but is not limited to, any type of scrambling code, coding scheme, function, encryption algorithm, etc., that may be reversibly applied to CRC message 160, and that is known by both UE 110 and base station 105. In an aspect, purpose-specific coding function 162 applied to CRC message 160 may be different from purpose-specific coding function 150 applied to random access sequence 146, although in other aspect they may be the same function.

For example, in an aspect of generating purpose-specific encoded CRC message 158, where purpose-specific coding function 162 includes a chirp CRC masking code, let $a_0, a_1, a_2, a_3, \ldots, a_{A-1}$ be chirp message 148 and $p_0, p_1, p_2, p_3, \ldots, p_{L-1}$ be the bits of CRC message 160 (e.g., 16 bits), which are computed and attached to the chirp message 148. After the attachment, the bits of CRC message 160 are scrambled according to the chirp functionality with the sequence $x_0, x_1, \ldots, x_{L-1}$ as indicated in the below Table 2 to form the sequence of bits $c_0, c_1, c_2, c_3, \ldots, c_{K-1}$ where $$c_k = a_k \text{ for } k=0,1,2,\ldots,A-1$$

where A is a length (e.g., in bits, from bit 0 to bit A−1, as noted above)) of the chirp message 148, and where k is the bit index in the chirp message.

$$c_k = (p_{k-A} + x_{k-A}) \bmod 2 \text{ for } k=A, A+1, A+2, \ldots, A+L-1$$

where L is a length (e.g., in bits, from bit 0 to bit L−1, as noted below) of the chirp CRC masking code (see Table 2).

TABLE 2

Example CRC mask for chirp message

| Chirp Purpose | Example Chirp CRC mask $<x_0, x_1, \ldots, x_{L-1}>$ |
|---|---|
| Random access | <0, 0, 0, 0, 0, 0, 0, 0, 0, 0, 0, 0, ..., 0> |
| Mobility Tracking | <1, 1, 1, 1, 1, 1, 1, 1, 1, 1, 1, 1, ..., 1> |
| System Information request | <0, 1, 0, 1, 0, 1, 0, 1, 0, 1, 0, 1, ..., 0, 1> |

In other words, according to the above formula, chirp message 148 is not encoded and CRC message 160 is encoded by the chirp CRC mask. As a result, purpose-specific encoded CRC chirp message 164, or $c_k$, may be represented as:

$$c_k = c_0 \ldots c_{A-1}, c_A \ldots c_{A+L-1}$$

where $c_0$ through $c_A$ represents the original value of chirp message 148 (e.g., the encoding does not change the original chirp message), and where $c_A$ through $c_{A+L-1}$ represents purpose-specific encoded CRC message 158 (e.g., the encoding modifies the CRS in order to provide the indication as to the purpose or function of chirp signal 142).

As such, upon receiving purpose-specific encoded CRC chirp message 164 and decoding it with a respective purpose-specific coding function 162, such as a respective one of the chirp CRC masks in Table 2, base station 105 may correlate the respective purpose-specific coding function 162 with a respective chirp purpose.

Figure 6:
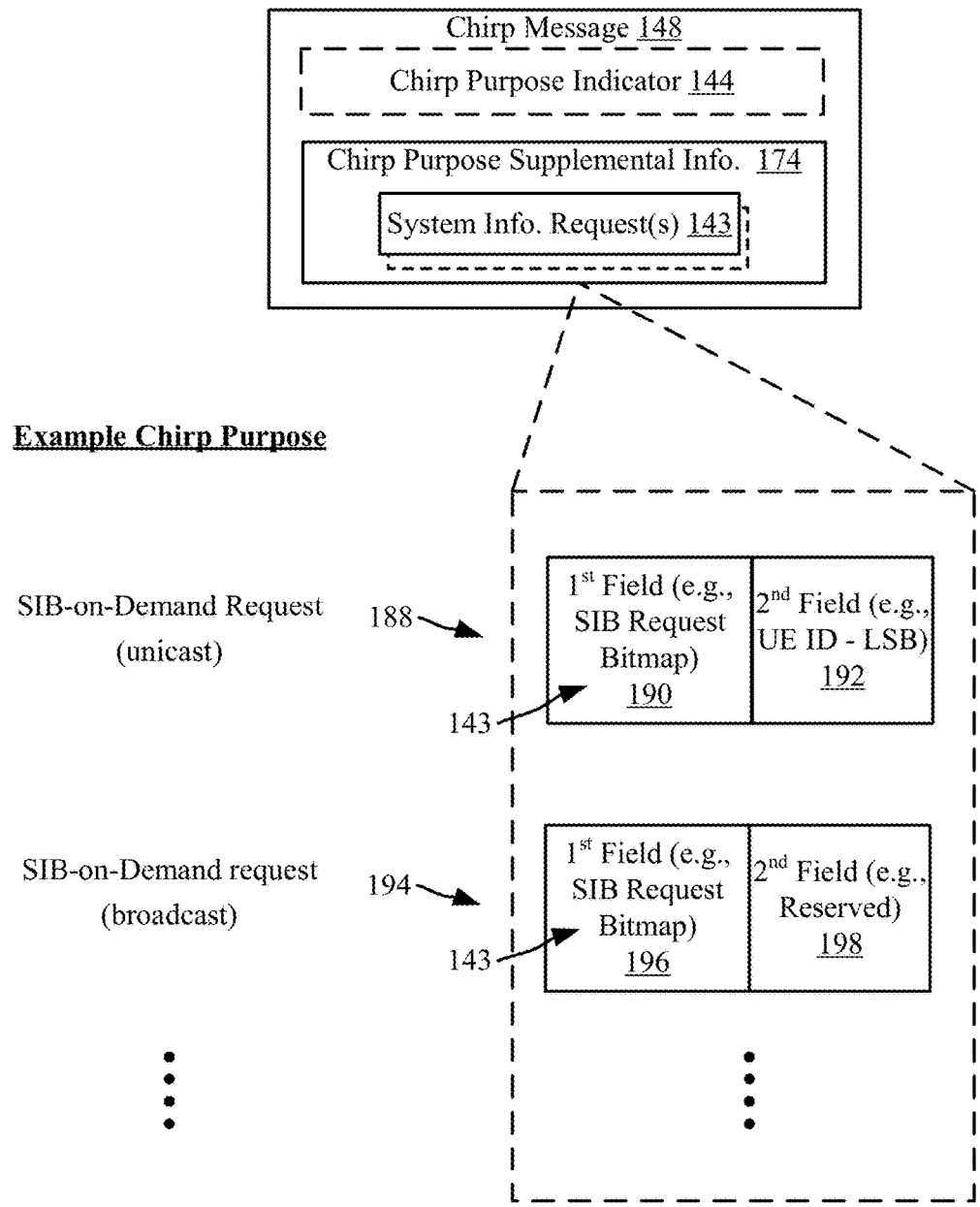
FIG. 6 is a schematic diagram of an aspect of a chirp message including the chirp purpose indicator and chirp supplemental information, which may include the one or more system information requests, and corresponding example implementations of different formats of the same.

Referring to FIG. 6, in an aspect, chirp message 148 including one or more system information requests 143 may have any one of a plurality of different contents, which may depend not only on the mechanism used to include chirp purpose indicator 144 (e.g., via inclusion with random access sequence 146 or chirp message 148, as described at a high level in above with respect to FIG. 5), but also on the chirp purpose. In particular, in an aspect, chirp message 148 may include different types of chirp purpose supplemental information 174, including one or more system information requests 143, which each may include different types of data in one or more data fields, which may include similar and/or different data fields depending on the chirp purpose.

For example, in the case of the chirp purpose being related to a "system information request" (also referred to as a "SIB-on-Demand request") associated with a unicast response from base station 105, chirp purpose supplemental information 174 may have a format 188 that includes a first field 190 containing data relevant to the particular SIBs being requested by UE 110, e.g., the one or more system information requests 143, and a second field 192 containing data related to identifying the requesting UE 110. For instance, in one example, first field 190 containing data relevant to the particular SIBs being requested may include, but is not limited to, an identifier of one or more SIBs that UE 110 would like base station 105 to provide to UE 110. For instance, referring back to FIG. 3, in one example use case that should not be construed as limiting, first field 190 including one or more system information requests 143 may be a SIB request bitmap, as discussed above, having a set of bits 151 with respective values that indicate whether a corresponding SIB 153 from a set of available SIBs 155 is being requested by UE 110. Regarding second field 192 containing data related to identifying the requesting UE 110, this may be all or some portion of a UE identifier (ID), which may include a unique or substantially-unique identifier of UE 110 (either globally or with respect to base station 105 or some portion of wireless communication network 100). Suitable examples of a UE ID may include at least one of, but are not limited to: a random access radio network temporary identity (RA-RNTI), which may be determined from a time slot number in which the preamble is sent; an international mobile subscriber identity (IMSI); a mobile equipment identifier (MEID) or an international mobile equipment identifier (IMEI), which are globally unique numbers identifying a physical piece of mobile station equipment (MEID typically given to CDMA devices; IMEI typically given to GSM devices); a cell radio network temporary identifier (C-RNTI); a globally unique temporary identifier (GUTI); an Internet Protocol address (IP address; such as an IPv4, IPv6, or Dual Stack IP address); etc.

In an example, first field 190 and second field 192, and their relative position within chirp message 148, are one non-limiting example of the one of more fields that may be included in the format 188 of chirp purpose supplemental information 174.

Additionally, in another example, in the case of the chirp purpose being related to a "SIB-on-Demand request" associated with a broadcast response from base station 105, chirp purpose supplemental information 174 may have a format 194 that includes a first field 196 containing data relevant to the particular SIBs being requested by UE 110, e.g., the one or more system information requests 143, and a second field 198 that may include any other relevant information or that may be a null or blank field. For instance, in one example, first field 196 containing data relevant to the particular SIBs being requested may include, but is not limited to, an identifier of one or more SIBs that UE 110 would like base station 105 to provide to UE 110, such as one or more system information requests 143 in the form of a SIB request bitmap as discussed above. In this case, second field 198 may be left blank, as compared to the unicast response example, because base station 105 may not need to identify UE 110 requesting the SIB information as no unicast link may be necessary (e.g., and the requested information may be broadcast for reception by any UEs in the coverage area of base station 105). For example, the SIB information broadcast in response to this "SIB-on-Demand request" may be available to any UEs receiving the broadcast, or may be encoded (e.g., with the SIB request bitmap 190, 196) such that only UEs requesting the broadcasted SIB information may decode it. This can provide a cooperation gain at the UEs, which may save some processing resources on non-requesting UEs in the coverage area of the respective base station 105. For example, first field 196 and second field 198, and their relative position within chirp message 148, are one non-limiting example of the one of more fields that may be included in the format 194 of chirp purpose supplemental information 174.

Also, chirp message 148 including chirp purpose supplemental information 174 may take on a variety of other formats with a variety of other contents in addition to the above-noted format 188 and format 194 for requesting system information. Thus, the above examples are merely for purposes of illustration and should not be construed as limiting.

Figure 7:
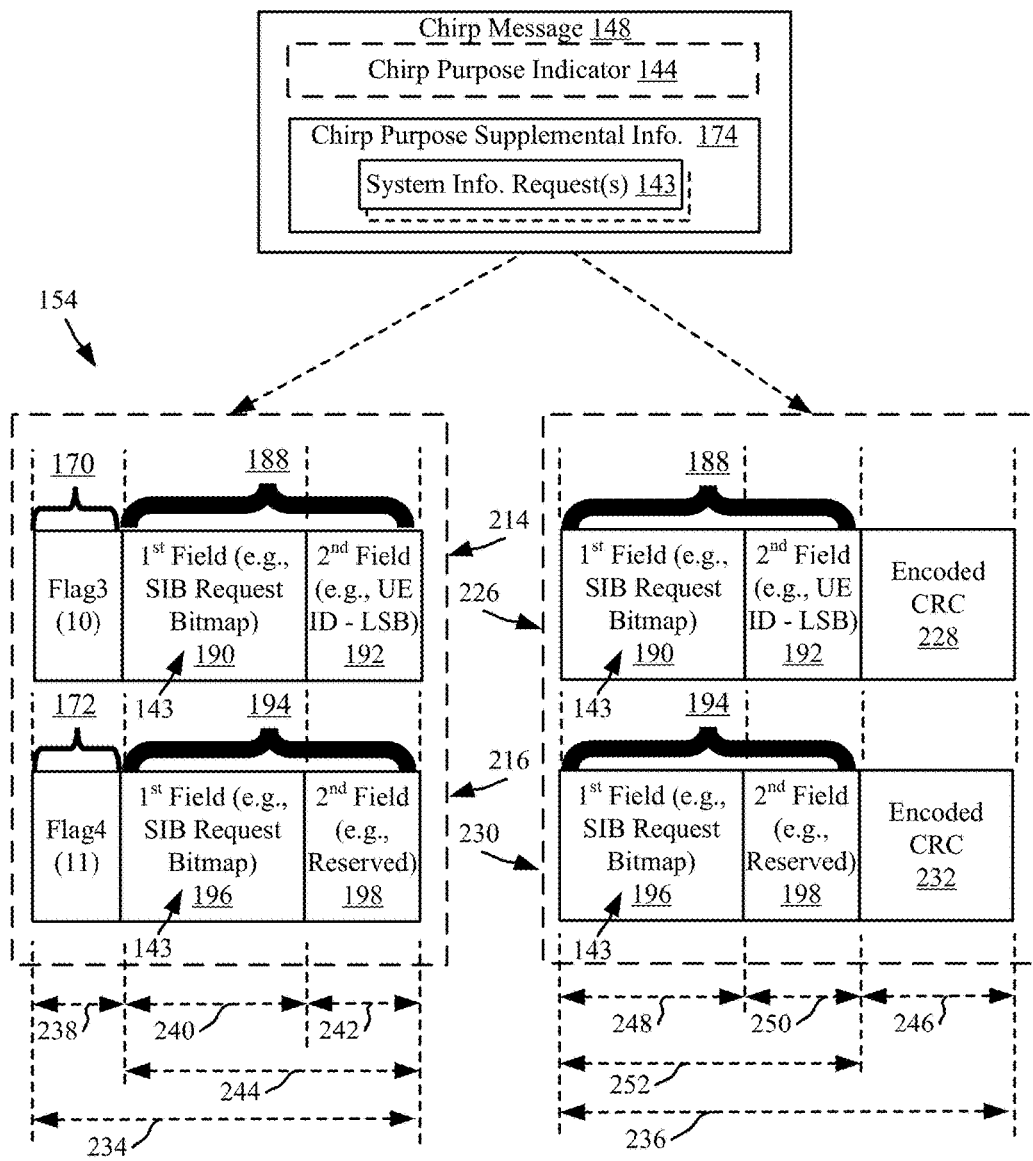
FIG. 7 is a schematic diagram of an aspect of a chirp message including the one or more system information requests as part of the chirp supplemental information, and optionally including the chirp purpose indicator, and corresponding example implementations of different formats of the same.

Referring to FIG. 7, chirp message 148 including one or more system information requests 143 may have any one of a plurality of different formats and contents depending on the mechanism used to include chirp purpose indicator 144, as described at a high level above with respect to FIGS. 4 and 5, and depending on the chirp purpose and corresponding chirp purpose supplemental information 174, as described at a high level above with respect to FIG. 6.

For example, in the case of chirp purpose indicator 144 being in the form of purpose-specific flag 154, various formats of chirp message 148 may include: a format 214 for a SIB-on-demand request (unicast) having Flag3 indicator 170 and format 188 of chirp purpose supplemental information 174; and, a format 216 for a SIB-on-demand request (broadcast) having Flag4 indicator 172 and format 194 of chirp purpose supplemental information 174.

Further, for example, in the case of chirp purpose indicator 144 being in the form of purpose-specific encoded CRC message 158 (e.g., CRC message 160 encoded with purpose-specific coding function 162), various formats of chirp message 148 may include: a format 226 for a SIB-on-demand request (unicast) having an encoded CRC 228 and format 188 of chirp purpose supplemental information 174; and, a format 230 for a SIB-on-demand request (broadcast) having an encoded CRC 232 and format 194 of chirp purpose supplemental information 174. In this example, encoded CRC 228 and encoded CRC 232 may be different CRC messages encoded with different coding sequences corresponding to the respective chirp purpose of requesting system information, such as a respective one of the CRC coding masks described above in Table 2.

Additionally, in some aspects, the different formats of chirp message 148 including chirp purpose indicator 144 and chirp purpose supplemental information 174 (including one or more system information requests 143) may have an overall message size (in bits, e.g., message size 234 and message size 236) that may be the same across different formats, or that may vary from one format to another, depending on a particular implementation. Similarly, each field size (in bits, e.g., flag indicator field size 238, first field size 240, second field size 242, purpose-specific supplemental information field size 244, and encoded CRC indicator field size 246, first field size 248, second field size 250, purpose-specific supplemental information field size 252) within each format may have a same size, or may have a different size, depending on a particular implementation. For example, in some implementations where improving UE 110 and base station 105 efficiency is a priority, the overall message size and field sizes may be consistent, which allows UE 110 to be more efficient in that it can generate a certain size message or field, which also allows base station 105 be more efficient by knowing in advance the length of each field. In other aspects, for example, where providing additional and/or variable information may be a priority, the message size and/or one or more field sizes may be variable depending on the content desired to be conveyed.

Thus, chirp message 148 including one or more system information requests 143, along with optionally including chirp purpose indicator 144 and chirp purpose supplemental information 174, may take on a variety of formats with a variety of other contents. The above formats are one set of examples, however, other formats in addition to the above-noted formats may be utilized. For example, different types of chirp purpose indicator 144 may be included in chirp signal 142 in different manners, e.g., other types or combinations of coding or signaling the chirp purpose indicator 144 may be utilized. Further, for instance, other types of formats and other contents may be used to define chirp signal 142 that may vary depending on the corresponding chirp purpose. Accordingly, the above examples are merely for purposes of illustration and should not be construed as limiting.

Figure 8:
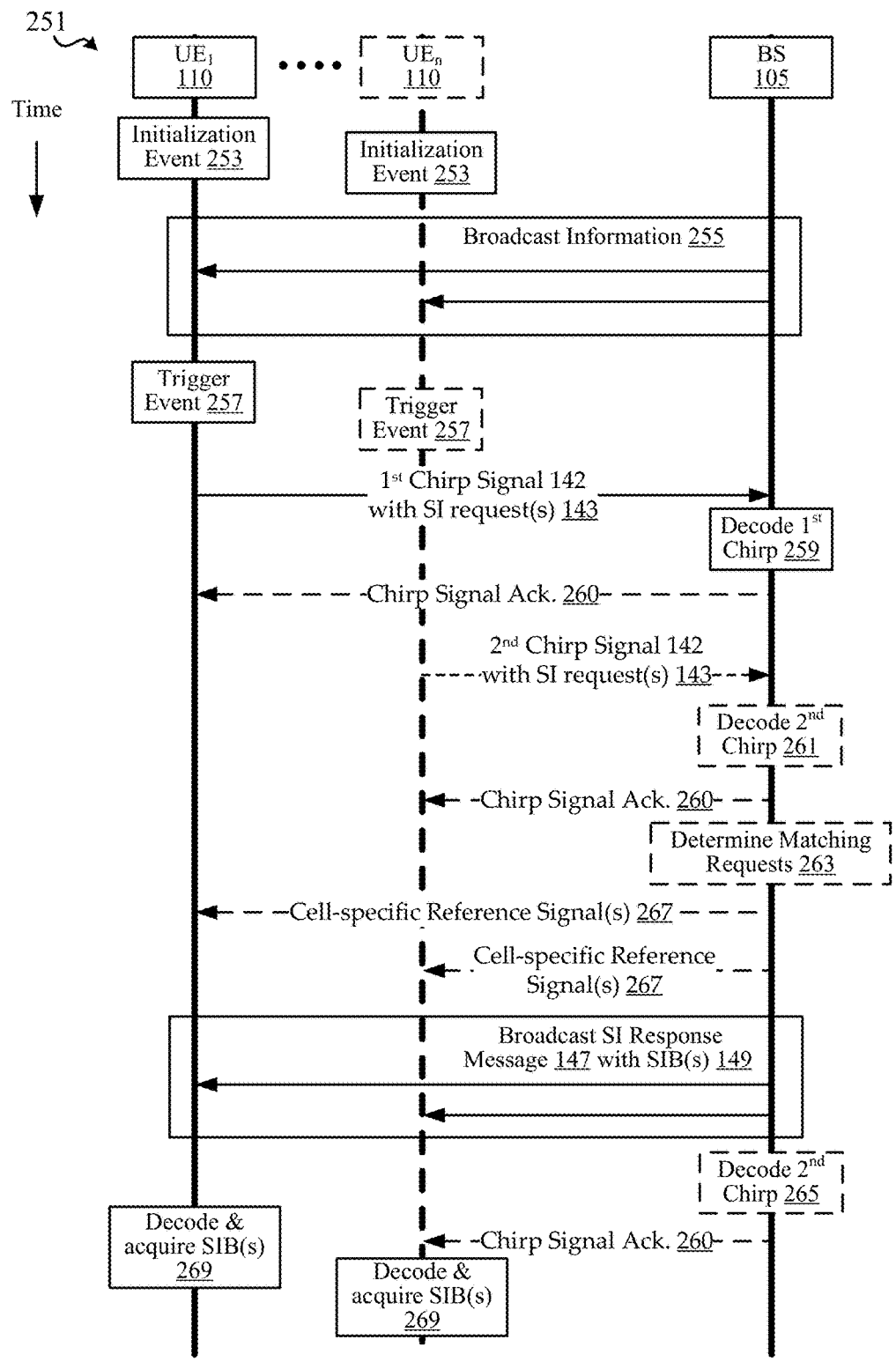
FIG. 8 is a message flow diagram of an aspect of a scenario for one or more UEs requesting and a base station providing, via a broadcast channel, one or more sets of system information, e.g., one or more SIBs-on-demand.

Referring to FIG. 8, an example message flow diagram 251 includes a SIB-on-demand scenario having events occurring over time at one or more UEs 110 (e.g., UE$_1$ to UE$_n$, where n is a positive integer) and at base station 105, and corresponding messaging, where this SIB-on-demand scenario incorporates one or more features of cooperative group broadcasting of system information as described herein. In particular, message flow diagram 251 may specifically relate to the scenario where a single UE 110 transmits chirp signal 142 having chirp purpose indicator 144 associated with a SIB-on-demand request with a broadcast response (e.g., chirp purpose indicator 144 being in the form of purpose-specific flag 154, such as format 216 for a SIB-on-demand request (broadcast) having Flag4 indicator 172 and format 194 of chirp purpose supplemental information 174; or, e.g., chirp purpose indicator 144 being in the form of purpose-specific encoded CRC message 158 (such as a CRC message 160 encoded with purpose-specific coding function 162) and chirp message 148 having format 230 for a SIB-on-demand request (broadcast) with encoded CRC 232 and format 194 of chirp purpose supplemental information 174).

Optionally, in one aspect, at least one UE 110 (e.g., UE$_1$ to UE$_n$) may initially detect an initialization event 253, such as being initially turned on and initializing communications, which may cause the respective UE 110 in this example to monitor one or more broadcast channels for broadcast information 255 for initial acquisition of a cell of base station 105.

Correspondingly, base station 105 may periodically transmit, via one or more broadcast channels, broadcast information 255. For instance, broadcast information 255 may include, but is not limited to, synchronization, frequency, timing, and basic system information (e.g., primary and second synchronization channels, a physical broadcast channel (PBCH), etc.) that allow any UE 110 to acquire and camp on base station 105. In other words, in an aspect, any UE 110 receiving broadcast information 255 may utilize the information to transition from the RRC-idle state to the RRC-common state.

As such, at least one UE 110 can monitor the one or more broadcast channels and decode broadcast information 255 in order to acquire initial communication access, e.g., to camp on, base station 105. The one or more broadcast channels, however, may not include (at least initially) certain system information for transitioning the UE 110 to an RRC-dedicated state with base station 105 and/or additional base stations in a corresponding zone.

Subsequently, at least one UE 110 may detect a trigger event 257 associated with acquiring additional system information by the respective UE 110. In other words, trigger event 257 is an event at the at least one UE 110 that causes the at least one UE 110 to request more system information, e.g., SIBs, such as by generating one or more system information requests 143. For example, the at least one UE 110 may need to establish a dedicated channel to make a call, or need to handover to a new zone, and/or need to obtain parameters for cell selection, cell reselection, etc. As such, the at least one UE 110 may acquire system information for establishing the call, or for the handover to the new zone, or for performing other handover-related, cell selection-related, and/or cell reselection-related functionalities. For instance, in one example that should not be construed as limiting, the UE 110 may generate the one or more system information requests 143 in the form of a SIB request bitmap as described above with respect to FIG. 3. Additionally, in an aspect, UE 110 may generate chirp purpose indicator 144 having a value and/or format that indicates a SIB-on-demand request associated with a broadcast response being expected by UE 110.

In response to detecting trigger event 257 and generating the one or more system information requests 143, the at least one UE 110 can transmit chirp signal 142 and include the one or more system information requests 143 in the contents of chirp signal 142. As described above, the form of chirp signal 142 may take on any one of a variety of formats depending on the particular network implementation. In an aspect, chirp signal 142 includes the one or more system information requests 143 in the form of a SIB request bitmap. Further, in an aspect, the transmitted chirp signal 142 may further include chirp purpose indicator 144 having the value and/or format that indicates a SIB-on-demand request associated with a broadcast response being expected by UE 110.

Base station 105 may perform decoding of chirp signal 142 at 259, and in response, may generate and transmit, via a broadcast channel, broadcast system information response message 147 that includes requested system information 149, e.g., the requested SIBs. In an aspect, broadcast system information response message 147 may be transmitted on a physical downlink control channel (PDCCH) for communicating control data from base station 105 to at least one UE 110, a physical downlink shared channel (PDSCH) channel that can be shared for communicating data from base station 105 to the one or more UEs 110, etc. In an aspect, base station 105 may determine to broadcast the response to chirp signal 142 based on chirp purpose indicator 144 having the value and/or format that indicates a SIB-on-demand request associated with a broadcast response being expected by UE 110. Further, in an aspect, broadcast system information response message 147 may be encoded with a coding scheme based on or a function of the one or more system information requests 143 in chirp signal 142. For instance, in the example of the one or more system information requests 143 being in the form of a SIB request bitmap, the SIB request bitmap may be used to encode broadcast system information response message 147. In an additional aspect, base station 105 may further encode broadcast system information response message 147 with a coding scheme based on or a function of the cell identifier (ID), e.g., serving cell ID, of the respective base station 105. Such encoding provides a degree of security, but allows any UE 110 that previously transmitted chirp signal 142 with the same set of one or more system information requests 143, e.g., the same SIB request bitmap (e.g., a SIB-on-demand bitmap requesting the same SIBs), to decode the broadcast system information response message 147 based on a portion of the chirp signal 142 (e.g., the portion that identifies the requested system information, such as the SIB request bitmap) to obtain the requested system information 149. For example, in this case, base station 105 may have received but not performed the decoding of the second chirp signal 142 from $UE_N$ (see, e.g., decode $2^{nd}$ chirp at 265 in the figure, which occurs after the broadcast system information response message 147), but $UE_N$ may decode the broadcast system information response message 147 to obtain the requested system information 149 in the instance where the SIB request bitmap sent by $UE_N$ is the same as the SIB request sent by $UE_1$ and already decoded by base station 105.

In another alternative or additional aspect, base station 105 may receive more than one chirp signal 142 requesting the same one or more system information requests 143 (e.g., the SIB request bitmap in both the first and second chirp signals from $UE_1$ and $UE_N$, respectively). As such, base station 105 may perform decoding of the respective chirp messages 142 at 259 and at 261, and base station 105 may further determine matching system information requests at 263. In response, base station 105 may realize the opportunity to reduce network resources and may generate and transmit, via a broadcast channel, broadcast system information response message 147 with requested system information 149, e.g., the requested SIBs.

In a further alternative or additional aspect, the generation and transmission of broadcast system information response message 147 may be part of or related to one or more subsequent transmissions sent by base station 105 that are triggered as a result of base station 105 receiving and successfully decoding at least one chirp signal 142 (e.g., the $1^{st}$ chirp signal in the example) For instance, these one or more subsequent transmissions may include, but are not limited to, a chirp signal acknowledgement message 260 and one or more cell-specific reference signals 267, as well as broadcast system information response message 147.

For example, in an aspect, in response to successfully decoding chirp signal 142 (and prior to the transmission of broadcast system information response message 147), base station 105 may transmit chirp signal acknowledgement message 260, also referred to herein as a "keep alive" (KA) message, to indicate to the respective UE 110 that base station 105 has successfully decoded the respective chirp signal 142. In an aspect, chirp signal acknowledgement message 260 may contain information, e.g., a single bit, having a value that indicates to the respective UE 110 whether or not the respective chirp signal 142 was successfully decoded (e.g., a value of "1" indicates success; a value of "0" indicates failure). Moreover, in an aspect, base station 105 may encode or scramble chirp signal acknowledgement message 260 to define an encoded chirp signal acknowledgement message, such as by using a coding scheme (as described above) that is based on or a function of at least a portion of chirp signal 142, such as but not limited to the one or more system information requests 143. In an example where the one or more system information requests 143 are in the form of a SIB request bitmap, base station 105 may scramble chirp signal acknowledgement message 260 with SIB request bitmap. UEs 110 use the SIB on-demand request bitmap (contained in their uplink chirp signal 142) to decode chirp signal acknowledgement message 260 or KA. Hence, UEs 110 (e.g., $UE_1$ to $UE_n$) that have sent the same SIB on-demand request bitmap (used to scramble or otherwise encode the KA) can decode the same KA. UEs 110 able to decode the KA can determine, for example, that the next broadcast system information response message 147 from the base station 105 includes system information requested from the UEs 110.

Further, for example, in an aspect, in response to successfully decoding chirp signal 142 (and, subsequent to transmitting chirp signal acknowledgement message 260, but prior to the transmission of broadcast system information response message 147), base station 105 may transmit one or more cell-specific reference signals 267 to provide UEs 110 with additional information that may be used to decode broadcast system information response message 147. Suitable examples of one or more cell-specific reference signals 267 include, but are not limited to, one or more measurement reference signals (MRSs) or one or more cell-specific synchronization signals. For instance, the one or more cell-specific reference signals 267 may allow each UE 110 to obtain a serving cell ID of the cell of the respective base station 105, which may be used in decoding the subsequent broadcast system information response message 147 (e.g., that may be broadcast over the PDSCH and encoded based on the one or more system information requests 143 and further based on the serving cell ID).

In other words, both the network (e.g., base station 105) and UEs 110 may save resources based on the present aspects, as base station 105 may transmit chirp signal acknowledgement message 260 or KA, one or more cell-specific reference signals 267, and broadcast system information response message 147 to multiple UEs 110 in response to successfully decoding at least one chirp signal 142, and as UEs 110 may correspondingly listen for one or more cell-specific reference signals 267, and broadcast system information response message 147 in response to receiving chirp signal acknowledgement message 260 or KA (as opposed to listening to broadcasts of system information the UEs 110 do not need).

Consequently, at least one UE 110 may receive broadcast system information response message 147, and if successfully decoded, acquire requested system information 149 (e.g., requested SIBs) at 269 and use them to acquire one or more subsequent transmissions 267. For example, in an aspect, the respective UEs 110 can know that base station 105 has successfully decoded chirp signal 142 based on receiving chirp signal acknowledgement message 260, or KA, having a value that indicates success. Accordingly, the respective UEs 110 may trigger resources to receive one or more cell-specific reference signals (e.g., MRS and/or cell-specific synchronization signal transmissions) to be able to detect the serving cell identifier (ID) of base station 105. Further, the respective UEs 110 may then be able to decode the PDCCH and/or PDSCH from the base station 105 based at least in part on using the serving cell ID and SIB request bitmap (from chirp signal 142 confirmed as successfully decoded by chirp signal acknowledgement message 260, or KA) to achieve SIB-on-demand, e.g., to obtain the one or more requested system information or SIBs. If any UE 110 fails to decode the PDCCH and/or PDSCH, which may occur if the UE 110 is requesting different system information than that broadcasted by the base station 105, the respective UE 110 may transmit another chirp signal 142 including the respective one or more system information requests 143.

Figure 9:
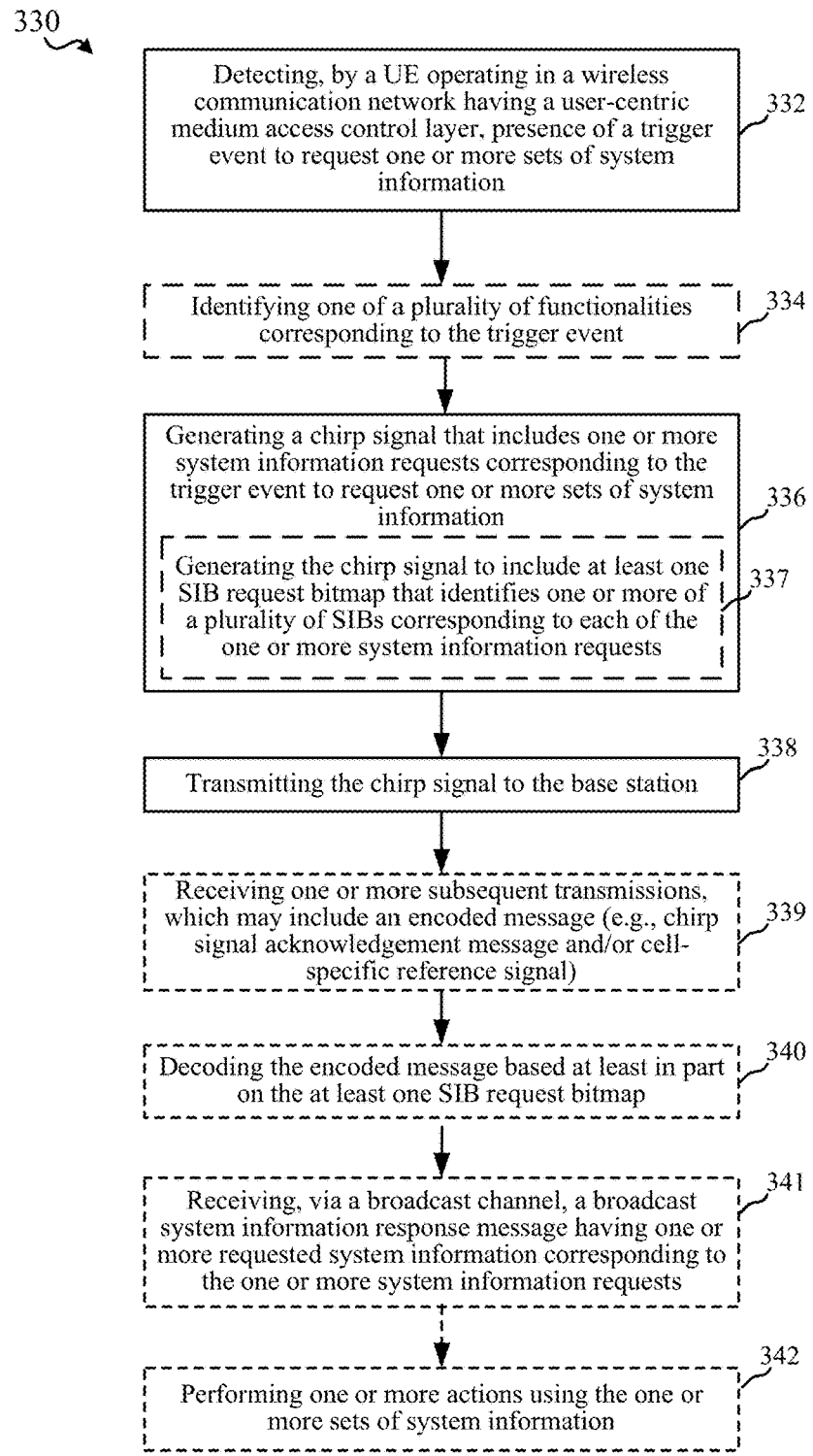
FIG. 9 is a flowchart of an aspect of a method of the UE sending a request to a network entity, such as a base station, using the chirp signal including the one or more system information requests.
Figure 10:
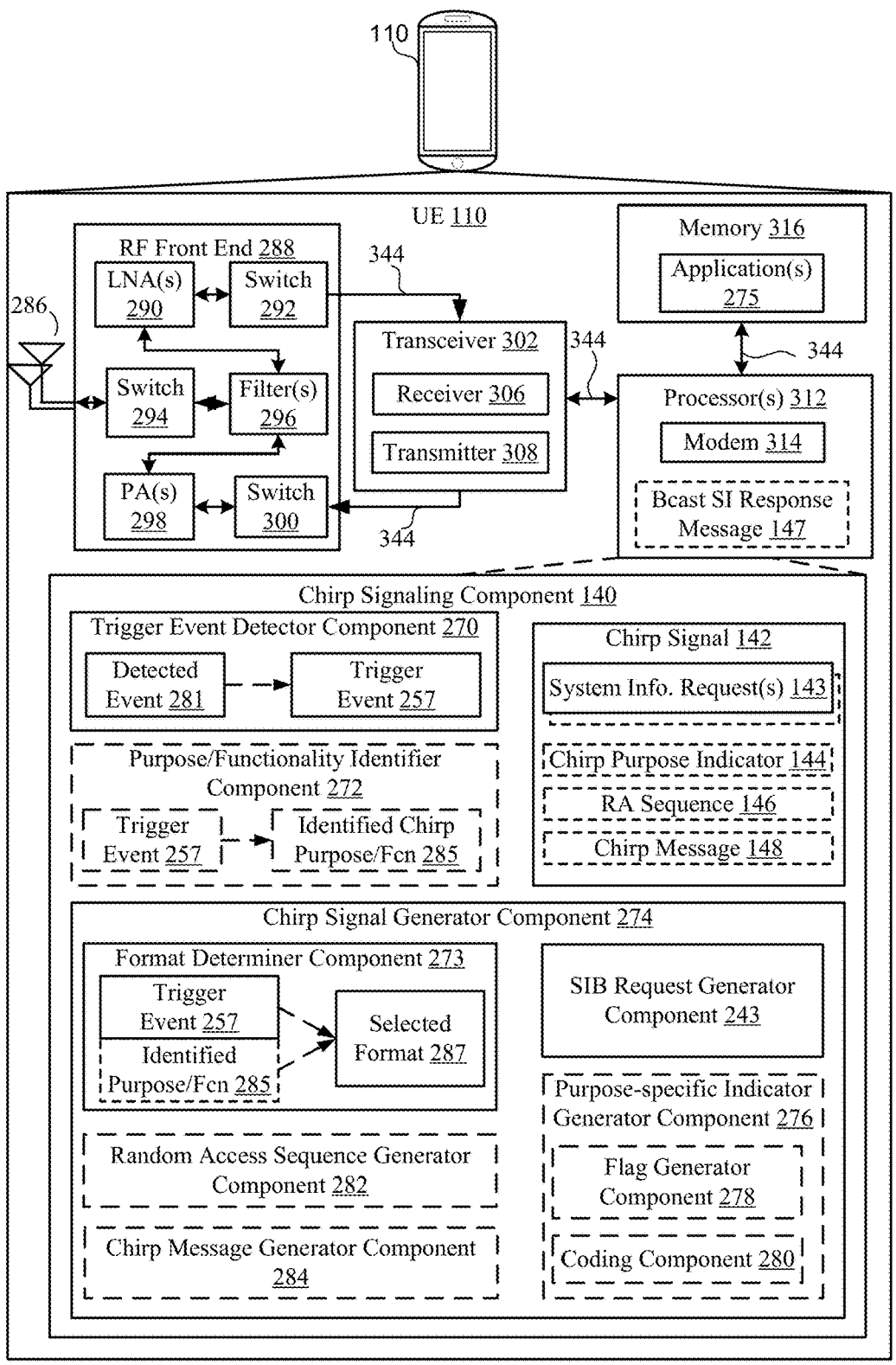
FIG. 10 is a schematic diagram of an aspect of an implementation of various components of the UE configured for communicating with the network entity, such as the base station, using the chirp signal including the one or more system information requests and receiving a chirp response message via a broadcast channel.

Referring to FIGS. 9 and 10, in another aspect, UE 110 may utilize chirp signal 142 having one or more system information requests 143, in any of the formats or alternatives described above, in a method 330 to request information from a network entity such as base station 105. For clarity, method 330 is described below with reference to one or more of the aspects described with reference to FIGS. 1-8. In some examples, UE 110 may execute one or more of the components described below, which may be implemented and/or defined in one or more processors 312 (FIG. 10), or in one or more sets of codes or instructions stored on a computer-readable medium (e.g., memory 316) as software or firmware and executable by processor 312, or programmed directly into a hardware element such as a module of processor 312, to control one or more components of UE 110 to perform the functions described below.

For example, at block 332, method 330 may include detecting, by the UE operating in a wireless communication network having a user-centric medium access control layer, presence of a trigger event to request one or more sets of system information. For instance, in an aspect, UE 110 may execute chirp signaling component 140 and/or trigger event detector component 270 to detect presence of a trigger event 257 to request system information from base station 105 of wireless communication network 100. As UE 110 may be operating in wireless communication network 100 having a user-centric medium access control layer, UE 110 may need to signal base station 105 to request various information that base station 105 may otherwise, in a non-user-centric medium access control layer implementation, periodically broadcast or send autonomously or without a request from UE 110. In one example that should not be construed as limiting, trigger event detector component 270 may include a processor, or computer-executable instructions stored on a computer-readable medium and executable by a processor, configured to identify one or more events occurring within the processing system of UE 110, e.g., detected event 281. For example, trigger event detector component 270 may monitor one or more protocol layers of a protocol stack of UE 110 and look for certain data or messages occurring at the one or more protocol layers, e.g., associated with a given function or purpose associated with a request or need for system information. Such data or messages may be previously identified and stored in memory 316 of UE 110, or may be dynamically updated via over-the-air messaging and stored in memory 316. Consequently, upon identifying one or more detected events 281, trigger event detector component 270 may compare a respective detected event 281 to a selected trigger event 257, selected from a plurality of trigger events, to determine if there is a match. If so, then trigger event detector component 270 may be configured to identify detected event 281 as trigger event 257, and initiate generation and transmission of chirp signal 142. If there is not a match, then trigger event detector component 270 may be configured to continue the monitoring operation.

For example, in an aspect, detecting presence of detected trigger event 257 may be related to an identified chirp purpose/function 285, such as a system information request purpose or function, which may be identified from among a plurality of chirp purposes or functions. For instance, upon powering on, UE 110 may tune one or more radio resources to one or more synchronizations channels and/or to one or more broadcast channels to obtain one or more signals carrying a limited number of parameters essential for initial access to a cell of base station 105. Such limited number of parameters may include, but are not limited to, one or more of downlink system bandwidth, a Physical HARQ Indicator Channel (PHICH) structure, the most significant eight-bits of the System Frame Number, a master information block (MIB), etc. In an aspect, the one or more radio resources may include, but are not limited to, receiver chain resources including one or more antennas 286, one or more RF front ends 288, one or more transceivers 302. In an aspect, the one or more synchronizations channels may include, but are not limited to, a primary synchronization channel and/or a secondary synchronization channel. In an aspect, the broadcast channel may include, but is not limited to, a physical broadcast channel (PBCH).

In an aspect, upon receiving the synchronization signal from a cell of base station 105, UE 110 may acquire a timing of the network from the synchronization signal, and in response to acquiring the timing of the network, transmit a pilot signal. The pilot signal transmitted by a UE 110 may be concurrently receivable by a plurality of cells (e.g., base stations 105) within the network. Each of the plurality of cells may measure a strength of the pilot signal, and the network (e.g., one or more of the base stations 105 and/or a central node within the core network 115) may determine a serving cell for UE 110. As such, in this case, UE 110 executing chirp signaling component 140 and/or trigger event detector component 270 may detect one or more of the above events, e.g., obtaining synchronization signals or network timing, or transmitting a pilot signal, and based on associations (e.g., stored in memory 316) of such detected events 281 with a corresponding trigger event 257, correlate one or more such detected events 281 to a respective trigger event 257 to signal a cell of base station 105 of the wireless communication network 100. In this example, for instance, trigger event 257 may be associated with a system information request purpose or function, e.g., identified chirp purpose/function 285, which may lead to transmitting chirp signal 142 to request one or more SIBs, thereby enabling the network to forego periodically broadcasting the system information in an unprompted manner and enabling UE 110 and the network to conserve power and communication resources, as described.

It should be noted that UE 110 executing chirp signaling component 140 and/or trigger event detector component 270 may be configured with other stored events that are associated with different types of system information requests (e.g., for any available SIB information), and hence likewise associated with a trigger event corresponding to a SIB request to signal a cell of base station 105.

Also, in another aspect, detecting presence of trigger event 257 may be related to other types of identified chirp purpose/function 285 different from a request or need for system information, such as but not limited to a random access request purpose or function, a mobility tracking purpose or function, or any other functions that may utilize UE requests to the network (as opposed to autonomous network transmissions) to obtain information.

Returning to method 330, at block 334, method 330 may optionally include identifying one of a plurality of functionalities corresponding to the trigger event. For example, in an aspect, UE 110 may execute chirp signaling component 140 and/or purpose/functionality identifier component 272 to identify one of a plurality of functionalities, e.g., identified chirp purpose/function 285, corresponding to trigger event 257. For instance, as described above, UE 110 may include in memory 316 stored associations between one or more events that may be detected by trigger event detector component 270 and one or more trigger events corresponding to one or more purposes or functionalities for which chirp signal 142 may be transmitted to base station 105. As such, purpose/functionality identifier component 272 can communicate with trigger event detector component 270, or these components 270, 272 may be an integral component, to receive the identified trigger event 257 and match it to a corresponding identified chirp purpose/function 285 selected from a plurality of purposes or functions. For instance, purpose/functionality identifier component 272 can be configured to identify a system information request function corresponding to the system information-related event. In such optional aspects, purpose/functionality identifier component 272 can be configured to identify a system information-related event, and to correlate such events to respective chirp signal purposes or functions in order to include a properly formatted chirp purpose indicator 144 and/or chirp signal 142 and/or random access sequence 146 and/or chirp message 148, as discussed in detail above.

Further, at block 336, method 330 may include generating a chirp signal that includes one or more system information requests corresponding to the trigger event to request one or more sets of system information. For example, in an aspect, UE 110 may execute chirp signaling component 140 and/or chirp signal generator component 274 (and/or one more of its subcomponents) to generate chirp signal 142 that includes one or more system information requests 143 corresponding to the trigger event 257 to request one or more sets of system information. In particular, chirp signal generator component 274 may include a SIB request generator component 243 configured to identify one or more SIBs associated with a given trigger event 257 and respectively generate a corresponding one or more system information requests 143. In an aspect, as described above, the one or more system information requests 143 may be in the form of a SIB request bitmap, and in this case, SIB request generator component 243 may set the value of each of the bits in the SIB request bitmap to match the SIBs that are needed by UE 110 based on the specific trigger event 257. For example, SIB request generator component 243 may store relationships between a plurality of trigger events 257 and corresponding one or more sets of system information. Accordingly, by referencing these relationships, SIB request generator component 243 may generate the proper set of one or more system information requests 143 for the given trigger event 257.

In some aspects, chirp signal generator component 274 may include a format determiner component 273 to obtain selected format 287 associated with identified trigger event 257, and/or with identified chirp purpose or function 285 in aspects implementing purpose/functionality identifier component 272. Selected format 287 may be any of the formats described above (e.g., with respect to FIGS. 1-8) in which chirp signal 142 may be transmitted. In particular, selected format 287 may include chirp signal 142 including chirp purpose indicator 144 having the value and/or format that indicates a SIB-on-demand request associated with a broadcast response being expected by UE 110.

Optionally, chirp signal generator component 274 may include a purpose-specific indicator generator component 276 configured to communicate with purpose/functionality identifier component 272 to obtain identified chirp purpose/function 285 associated with identified trigger event 257, and, optionally, with a format determiner component 273 to obtain selected format 287 associated with identified trigger event 257. Moreover, in some aspects, purpose-specific indicator generator component 276 may be configured to communicate with random access sequence generator component 282 that operates to generate random access sequence 146, and/or to communicate with chirp message generator component 284 that operates to generate chirp message 148 in order to generate a format of chirp purpose indicator 144 to identify the formatting of the contents of chirp signal 142.

For instance, in one example that should not be construed as limiting, chirp signal generator component 274 may include format determiner component 273 in communication with purpose/functionality identifier component 272, and thus is aware of the identified chirp purpose or function that has been detected and identified as described above. Accordingly, based on stored rules or associations, format determiner component 273 can identity a particular format to be used to generate chirp signal 142, and chirp purpose indicator 144, e.g., having the value and/or format that indicates a SIB-on-demand request associated with a broadcast response being expected by UE 110, based at least in part on the identified chirp purpose or function. Further, format determiner component 273 may additionally identity a particular format to be used to generate chirp signal 142 based on a received or otherwise stored or known configuration, e.g., the manner in which chirp purpose indicator 144 is to be included in chirp signal. For example, format determiner component 273 may execute different sets of formatting rules if chirp purpose indicator 144 is to be included in chirp signal 142 separate from random access sequence 146 and/or chirp message 148, or as a part of random access sequence 146 and/or chirp message 148, and/or further based on the mechanism used (e.g., flag, coding, etc.) to add chirp purpose indicator 144 to random access sequence 146 and/or chirp message 148.

Moreover, based on the format determined by format determiner component 273, chirp signaling component 140 and/or chirp signal generator component 274 may operate one or any combination of purpose-specific indicator generator component 276, random access sequence generator component 282, or chirp message generator component 284 to generate chirp signal 142 having at least chirp purpose indicator 144 to identify the formatting of the contents of chirp signal 142.

For instance, purpose-specific indicator generator component 276 may include, but is not limited to, a flag generator component 278 having instructions and rules to enable generation of a selected flag value from a plurality of flag values, where the selected flag value corresponds to the identified one of the plurality of chirp purposes or functionalities. As such, in one aspect, chirp signaling component 140 and/or chirp signal generator component 274 may operate flag generator component 278 and chirp message generator component 284 to generate purpose-specific flagged chirp message 156, including but not limited to format 214 and format 216. In particular, flag generator component 278 may be configured to generate purpose-specific flag 154 having a selected flag value from a plurality of flag values, where the selected flag value corresponds to the identified one of the plurality of chirp purposes or functionalities, and chirp message generator component 284 may be configured to generate chirp message 148 and add purpose-specific flag 154 to chirp message 148 to define purpose-specific flagged chirp message 156 and, at least in part, the chirp signal 142.

Additionally or alternatively, for example, purpose-specific indicator generator component 276 may include, but is not limited to, a coding component 280 having instructions and coding rules and coding sequences to enable generation of a selected purpose-specific coding function (e.g., purpose-specific coding function 150, and/or purpose-specific coding function 162) from a plurality of purpose-specific coding functions to define an encoded message, where the selected purpose-specific coding function corresponds to the identified one of the plurality of functionalities. As such, in one aspect, chirp signaling component 140 and/or chirp signal generator component 274 may operate coding component 280 and random access sequence generator component 282 to generate purpose-specific encoded random access sequence 152. In particular, random access sequence generator component 282 may be configured to generate a random access sequence by randomly selecting one of a plurality of known random access sequences, and coding component 280 may be configured to encode the random access sequence with a selected purpose-specific coding function 150 from a plurality of purpose-specific coding functions to define encoded random access sequence 152, where the selected purpose-specific coding function 150 corresponding to the identified one of the plurality of chirp purposes or functionalities to define, at least in part, chirp signal 142.

Alternatively, chirp signaling component 140 and/or chirp signal generator component 274 may operate coding component 280 and chirp message generator component 284 to generate purpose-specific encoded CRC chirp message 164, including but not limited to format 226 and format 230. In particular, coding component 280 may be configured to generate CRC message 160 based on chirp signal 142, and to encode CRC message 160 with a selected purpose-specific coding function 162 from a plurality of purpose-specific coding functions to define purpose-specific encoded CRC message 158. Then, chirp message generator component 284 may be configured to generate chirp message 148, and to add purpose-specific encoded CRC message 158 to chirp message 148 to define purpose-specific encoded CRC chirp message 164 and, at least in part, the chirp signal 142.

Additionally, regarding method 330 at block 336 for generating chirp signal 142 including one or more system information requests 143, as is evident from the above examples, chirp signal 142 generated by chirp signal generator component 274 may vary in content, e.g., depending on the one or more system information requests 143, and/or depending on the corresponding identified chirp purpose/function 285 and/or selected format 287. Moreover, the same or different content that may be contained within the same or different fields of chirp signal 142 may have a fixed size, or may have a dynamic, variable size. Examples of such varied contents and formats of chirp signal 142 are discussed above with respect to FIGS. 1-8.

In other words, UE 110 implementing method 330 at block 336 for generating chirp signal 142 including one or more system information requests 143 may operate format determiner component 273 to execute format rules to generate any one of the formats of chirp signal 142, chirp purpose indicator 144, random access sequence 146, or chirp message 148, as discussed above with respect to FIGS. 1-8.

In one example, generating the chirp signal at block 336 may optionally include, at block 337, generating the chirp signal to include at least one SIB request bitmap that identifies one or more of a plurality of SIBs corresponding to each of the one or more system information requests. In an example, chirp signal 142 generated by chirp signal generator component 274 may include at least one SIB request bitmap 190, 196 that identifies one or more of a plurality of SIBs being requested by the system information requests 143. In an example, the SIB request bitmap 190, 196 may be included in a chirp message 148 of the chirp signal, a chirp purpose indicator 144 of the chirp signal 142, chirp purpose supplemental information 174 of the chirp message 148, etc.

Additionally, for example, at block 338, method 330 may include transmitting the chirp signal to the base station. For example, in an aspect, UE 110 may execute chirp signaling component 140 and/or one or more transmit chain components (e.g., modem 314, transceiver 302, RF front end 288, antennas 286) to transmit chirp signal 142 to base station 105. For instance, chirp signal 142 may take any of the formats discussed above and, in one example, may including one or more system information requests 143, at least one SIB request bitmap 190, 196, etc. In an aspect, base station 105 may transmit chirp signal 142 including chirp purpose indicator 144 having the value and/or format that indicates a SIB-on-demand request associated with a broadcast response is being expected by UE 110.

Optionally, at block 339, method 330 may include receiving one or more subsequent transmissions, which may include an encoded message, in response to the chirp signal. For example, in an aspect, UE 110 may execute one or more receive chain components (e.g., antennas 286, RF front end 288, transceiver 302, and/or modem 314, etc.) to receive chirp signal acknowledgement message 260, or KA, (e.g., as the encoded message) to acknowledge receipt of the at least one chirp signal (and, e.g., so UE 110 can determine whether to expect a subsequent broadcast of the requested SIBs in aspects where the chirp signal includes this type of formatted chirp purpose indicator 144), and/or one or more cell-specific reference signals 267 (e.g., measurement reference signal (MRS), and/or cell-specific synchronization signal, PDCCH, PDSCH, etc.) that enable the user equipment to determine a serving cell identifier of the base station. In an aspect, UE 110 is triggered to tune one or more receive chain components to receive the one or more subsequent transmissions in response to the receiving of chirp signal acknowledgement message 260. In an example, the chirp signal acknowledgement message 260, or KA, can be scrambled or otherwise encoded using a SIB request bitmap.

Optionally, at block 340, method 330 can include decoding the encoded message based at least in part on the at least one system information block request bitmap. For example, in an aspect, UE 110 may execute one or more receive chain components (e.g., antennas 286, RF front end 288, transceiver 302, and/or modem 314, etc.) to decode (e.g., descramble or otherwise) the encoded message (e.g., the chirp signal acknowledgement message 260, or KA) using the at least one SIB request bitmap (e.g., SIB request bitmap 190, 196). This SIB request bitmap can be the bitmap it transmitted to the base station 105. In an example, the UE 110 can then determine whether a subsequent broadcast system information response message is to include requested system information (e.g., where decoding/descrambling of the chirp signal acknowledgement message 260, or KA, using a SIB request bitmap succeeds).

Optionally, at block 341, method 330 may further include receiving, via a broadcast channel, a broadcast system information response message having one or more requested system information corresponding to the one or more system information requests, and, optionally, at block 342, performing one or more actions using the one or more sets of system information. For example, in an aspect, UE 110 may execute one or more receive chain components (e.g., antennas 286, RF front end 288, transceiver 302, and/or modem 314, etc.) to receive broadcast system information response message 147 via a broadcast channel from base station 105, and to perform the one or more actions using the one or more sets of system information. Broadcast system information response message 147 may include, at least, one or more requested system information 149, e.g., one or more SIBs, that respectively correspond to the one or more system information requests 143 in chirp signal 142, and/or may be received in response to transmitting the chirp signal at block 338, as described.

In an aspect, the receiving of broadcast system information response message 147 may include receiving an encoded broadcast system information response message 147, and as such, the receiving may further include decoding the encoded broadcast system information response message 147. For instance, encoded broadcast system information response message 147 may be encoded with an encoding scheme that is based on or a function of at least a portion of chirp signal 142, such as based on the one or more system information requests 143 (e.g., based on the SIB request bitmap). Optionally, encoded broadcast system information response message 147 may be encoded with an encoding scheme that is based on or a function of a serving cell ID of base station 105, in addition to being encoded based on at least a portion of chirp signal 142, such as based on the one or more system information requests 143 (e.g., based on the SIB request bitmap). As such, UE 110 may execute one or more receive chain components to communicate with chirp signaling component 140 to acquire the one or more system information requests 143 (e.g., SIB request bitmap), and the one or more receive chain components may have already decoded one or more cell-specific reference signals 267 to determine the serving cell ID, and thus may utilize this information for decoding the encoded broadcast system information response message 147.

Moreover, in an aspect, UE 110 may execute a corresponding one or more applications 275 and/or one or more other components of UE 110 related to the one or more requested system information 149 or to the chirp purpose and the received contents of broadcast system information response message 147. For example, the one or more applications 275 may include applications or services on UE 110, such as but not limited to a voice call application, a data call (e.g., short message service, multi-media message service) application, cell or zone selection, reselection, and handover applications or components, etc. For instance, in the case of identified chirp purpose/function 285 being related to a system information request based on the operation of cell or zone selection, reselection, and handover applications or components, UE 110 may receive broadcast system information response message 147 including one or more sets of system information (e.g., one or more SIBs), and in response may utilize such information to perform the actions of operating one or more transmit and/or receive chain components, as described above. For example, UE 110 may, based on the received one or more sets of system information, establish and maintain a dedicated communication channel with base station 105 (e.g., UE 110 transitions from an RRC common mode to an RRC dedicated mode). In another example, UE 110 may, based on the received one or more sets of system information, perform intra-frequency and/or inter-frequency and/or inter-radio access technology measurements, access a home eNode B (e.g., femtocell), obtain multimedia broadcast multicast service (MBMS) control information associated with one or more multicast-broadcast single-frequency network (MBSFN) areas, or perform any other function related to acquiring system information.

Referring specifically to FIG. 10, one example of an implementation of UE 110 may include a variety of components, some of which have already been described above, but including components such as one or more processors 312 and memory 316 and transceiver 302 in communication via one or more buses 310, which may operate in conjunction with chirp signaling component 140 to enable one or more of the functions described herein related to including one or more system information requests 143 in chirp signal 142. Further, the one or more processors 312, modem 314, memory 316, transceiver 302, RF front end 288 and one or more antennas 286, may be configured to support voice and/or data calls (simultaneously or non-simultaneously) in one or more radio access technologies.

In an aspect, the one or more processors 312 can include a modem 314 that uses one or more modem processors. The various functions related to chirp signaling component 140 may be included in modem 314 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 314 associated with chirp signaling component 140 may be performed by transceiver 302.

Also, memory 316 may be configured to store data used herein and/or local versions of applications or chirp signaling component 140 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining chirp signaling component 140 and/or one or more of its subcomponents, and/or data associated therewith, when UE 110 is operating at least one processor 312 to execute chirp signaling component 140 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 105. Additionally, receiver 306 may process such received signals, and also may obtain measurements of the signals, such as, but not limited to, Ec/Io, SNR, RSRP, RSSI, etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 110 may include RF front end 288, which may operate in communication with one or more antennas 286 and transceiver 302 for receiving and transmitting radio transmissions, for example, wireless communications transmitted by at least one base station 105 or wireless transmissions (e.g., chirp signal 142) transmitted by UE 110. RF front end 288 may be connected to one or more antennas 286 and can include one or more low-noise amplifiers (LNAs) 290, one or more switches 292, 294, 300, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 300 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292, 294, 300 to select a transmit or receive path using a specified filter 296, LNA 290, and/or PA 298, based on a configuration as specified by transceiver 302 and/or processor 312.

As such, transceiver 302 may be configured to transmit and receive wireless signals through one or more antennas 286 via RF front end 288. In an aspect, transceiver may be tuned to operate at specified frequencies such that UE 110 can communicate with, for example, one or more base stations 105 or one or more cells associated with one or more base stations 105. In an aspect, for example, modem 314 can configure transceiver 302 to operate at a specified frequency and power level based on the UE configuration of the UE 110 and the communication protocol used by modem 314.

In an aspect, modem 314 can be a multiband-multimode modem, which can process digital data and communicate with transceiver 302 such that the digital data is sent and received using transceiver 302. In an aspect, modem 314 can be multiband and be configured to support multiple frequency bands for a specific communications protocol. In an aspect, modem 314 can be multimode and be configured to support multiple operating networks and communications protocols. In an aspect, modem 314 can control one or more components of UE 110 (e.g., RF front end 288, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 11:
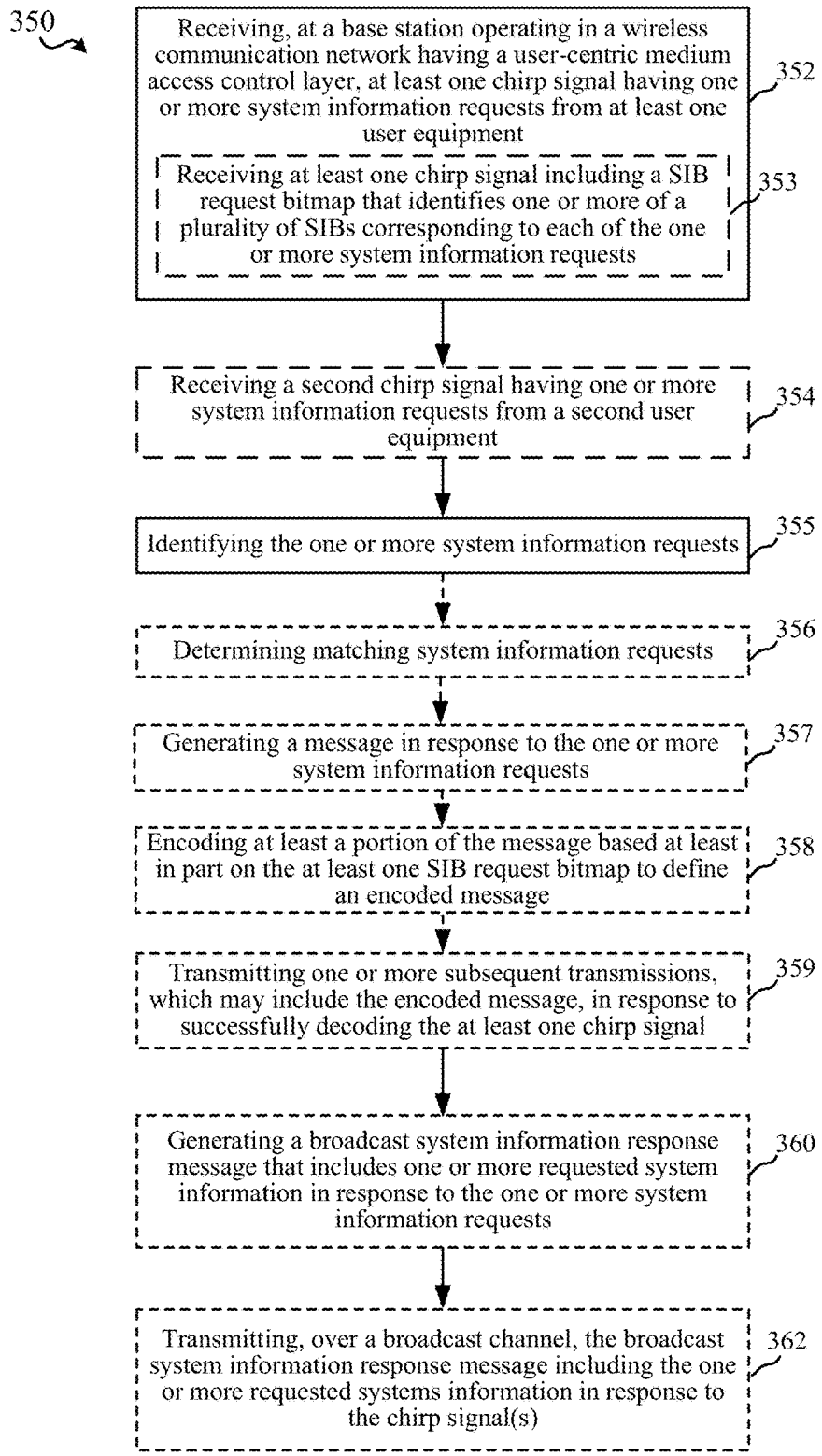
FIG. 11 is a flowchart of an aspect of a method of operating a base station to communicate with one or more user equipment and to respond to one or more chirp signals including the one or more system information requests with a chirp response message transmitted via a broadcast channel, as described herein.
Figure 12:
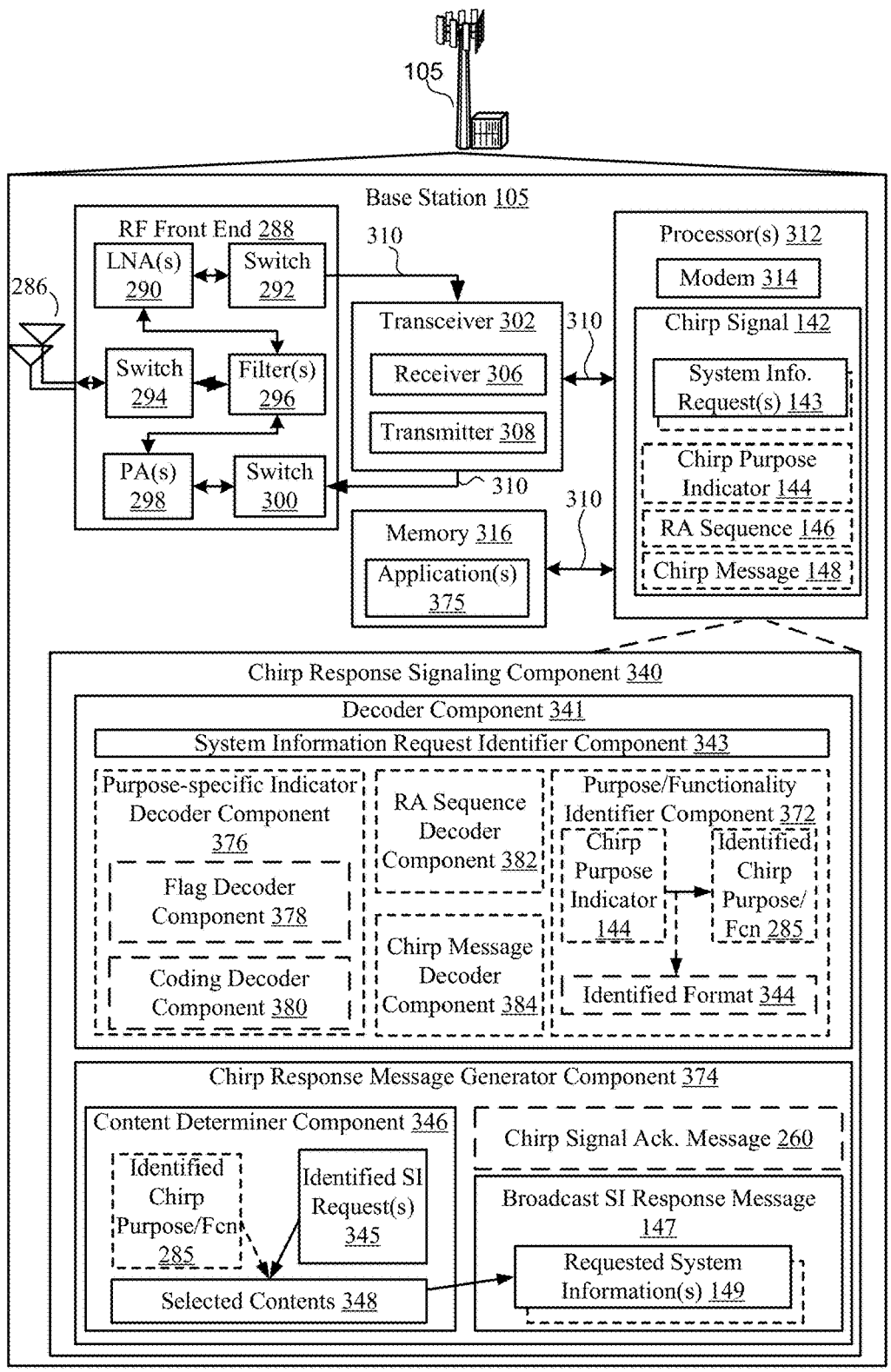
FIG. 12 is a schematic diagram of an aspect of an implementation of various components of the base station configured for communication with a user equipment, such as for operating a base station to respond to one or more chirp signals including the one or more system information requests with a chirp response message transmitted via a broadcast channel, as described herein.

Referring to FIGS. 11 and 12, a method 350 (FIG. 11) and corresponding components (FIG. 12) are described for operating base station 105 to respond to chirp signal 142 including one or more system information requests 143 and transmit, via a broadcast channel, broadcast system information response message 147 including one or more requested system information 149 respectively corresponding to the one or more system information requests 143, as described herein.

At block 352, method 350 includes receiving, at the base station operating in a wireless communication network having a user-centric medium access control layer, at least one chirp signal having one or more system information requests from at least one user equipment. For example, in an aspect, base station 105 operating in a wireless communication network having a user-centric medium access control layer may operate one or more receive chain components (e.g., antennas 286, RF front end 288, transceiver 302, processor 312, and/or modem 314) to receive at least one chirp signal 142 having one or more system information requests 143 from at least one user equipment 110.

In receiving the at least one chirp signal in block 352, method 350 may optionally include, at block 353, receiving at least one chirp signal including a SIB request bitmap that identifies one or more of a plurality of SIBs corresponding to each of the one or more system information requests. For example, the at least one chirp signal may include the SIB request bitmap, as described, in a chirp message 148 portion of the chirp signal (e.g., as part of a chirp purpose indicator 144 or otherwise), in chirp purpose supplemental information 174 in the chirp message 148, etc. In an example, base station 105 operating in a wireless communication network having a user-centric medium access control layer may operate one or more receive chain components (e.g., antennas 286, RF front end 288, transceiver 302, processor 312, and/or modem 314) to receive and accordingly decode the at least one chirp signal to obtain the SIB request bitmap.

Optionally, at block 354, method 350 further includes receiving a second chirp signal having one or more system information requests from a second user equipment. For example, in an aspect, base station 105 may operate the one or more receive chain components (described above) to receive a second chirp signal 142 having one or more system information requests 143 from a second user equipment 110.

According to the present aspects, the at least one chirp signal 142 received at block 352, and the second chirp signal 142 received at block 354, may have any of the various formats and contents described herein. In particular, each respective chirp signal 142 may additionally include chirp purpose indicator 144, random access sequence 146, and/or chirp message 148, in any of the formats described above. For instance, each respective chirp signal 142 may be a "system information request" (also referred to as a "SIB-on-Demand request") associated with a unicast response (e.g., format 188 (FIG. 6), or format 214, or format 226 (FIG. 7)), or be a "system information request" associated with a broadcast response (e.g., format 194 (FIG. 6), or format 216, or format 230 (FIG. 7)). Further, in an aspect, each respective chirp signal 142 may include chirp message 148 containing the one or more system information requests 143 in one or more fields, such as in field 190 or field 196 of the above-noted formats of system information requests. Moreover, in an aspect, the one or more system information requests 143 may be in the form of a SIB request bitmap (FIG. 3).

At block 355, method 350 includes identifying the one or more system information requests. For example, in an aspect, base station 105 may operate a decoder component 341 and/or a system information request identifier component 343 to identify the one or more system information requests 143, e.g., identified system information (SI) requests 345, contained in a respective one or more received chirp signals 142. For instance, in an aspect, system information request identifier component 343 is configured to parse chirp signal 142 and identify data within chirp signal 142 as corresponding to the one or more system information requests 143, e.g., by matching the data in chirp signal 142 with known data values or formats of known system information requests. In a further alternative, system information request identifier component 343 may be configured to parse chirp signal 142 and identify data within chirp signal 142 as corresponding to chirp purpose indicator 144, e.g., such as a SIB-on-demand request associated with a broadcast response.

In another aspect, for instance where chirp signal 142 includes chirp purpose indicator 144, system information request identifier component 343 may decode and read/determine a particular format or value of chirp purpose indicator 144, and system information request identifier component 343 can correlate the identified particular format or value of chirp purpose indicator 144 to a known format of chirp signal 142 and hence to a known location within chirp signal 142 to obtain the one or more system information requests 143. In this case, in an aspect, system information request identifier component 343 may communicate with a purpose/functionality identifier component 372 to identify a format 344 and corresponding contents of chirp signal 142 based on a format of chirp purpose indicator 144. As discussed above, as chirp purpose indicator 144 may be correlated to a known format and content of a corresponding chirp signal 142, the recognition of a known chirp purpose indicator 144 can be correlated to an identified format 344 of chirp signal 142, random access sequence 146, and/or chirp message 148.

Optionally, in the case where chirp signal 142 includes chirp purpose indicator 144, system information request identifier component 343 may operate in communication with a purpose-specific indicator decoder component 376 (including flag decoder component 378 and/or coding decoder component 380) and a purpose/functionality identifier component 372, to identify one of a plurality of chirp purposes or functionalities, e.g., identified chirp purpose or function 285, based at least in part on chirp purpose indicator 144. Optionally, to obtain identified chirp purpose or function 285, decoder component 341 may also operate random access sequence decoder component 382 and/or chirp message decoder component 384. In some aspects, the operation of purpose-specific indicator decoder component 376 (including flag decoder component 378 and/or coding decoder component 380), random access sequence decoder component 382 and/or chirp message decoder component 384 may be based on a reverse or inverse of the operation or a reverse or inverse of the algorithm or coding scheme used by UE 110 in coding chirp signal 142, and/or chirp purpose indicator 144, and/or random access sequence 146, and/or chirp message 148. Further, in some aspects, the operation of flag decoder component 378 may be based on matching the encoded or decoded chirp purpose indicator 144 with a respective one of a set of known or stored flag values, which are mapped to corresponding ones of a set of known chirp purpose indicators 144 that each correspond to a respective identified chirp purpose or function 285.

Optionally, at block 356, method 320 may include determining matching system information requests. For example, in an aspect, base station 105 may operate decoder component 341 and/or system information request identifier component 343 to determine matching system information requests between two or more received chirp signals 142. For instance, upon identifying the respective one or more system information requests 143 in at least two chirp signals 142, system information request identifier component 343 may include rules or functions to compare the respective system information requests 143 to determine whether all or some portion of the respective system information requests 143 match. In other words, in an example, system information request identifier component 343 can compare each system information request 143 to determine whether the same system information is being requested. For instance, in the case of the respective one or more system information requests 143 being in the form of a SIB request bitmap (FIG. 3), system information request identifier component 343 compares the value of each bit 151 at each bit position to identify if all or some portion (e.g., a subset of system information requests) in each respective bitmap match, which can result in defining matching system information requests (e.g., all requests match) or a matching subset of system information requests (e.g., some overlapping portion of at least two respective sets of system information requests are matching).

Optionally, at block 357, method 350 can include generating a message in response to the one or more system information requests. For example, in an aspect, base station 105 may operate one or more transmit chain components (e.g., modem 314, processor 312, transceiver 302, RF front end 288, and antennas 286, etc.) and/or chirp response message generator component 374 to generate one or more of chirp signal acknowledgement message 260, or KA, to acknowledge receipt of the at least one chirp signal, and/or one or more cell-specific reference signals 267 (e.g., measurement reference signal (MRS), and/or cell-specific synchronization signal, PDCCH, PDSCH, etc.) that enable UEs 110 to determine a serving cell identifier of the cell of base station 105 with which UE 110 is communicating. In an aspect, base station 105 is triggered to generate these one or more subsequent transmissions in response to successfully decoding at least one chirp signal 142. Alternatively, for example, transceiver 302 (and/or to processor 312 and/or modem 314) may include rules or functions to initiate generating the one or more subsequent transmissions in response to successfully decoding at least one chirp signal 142.

Optionally, at block 358, method 350 may include encoding at least a portion of the message based at least in part on the at least one SIB request bitmap to define an encoded message. For example, in an aspect, base station 105 may operate one or more transmit chain components (e.g., modem 314, processor 312, transceiver 302, RF front end 288, and antennas 286, etc.) and/or chirp response message generator component 374 to encode at least the portion of the message based at least in part on the at least one SIB request bitmap to define an encoded message. For example, chirp response message generator component 374 may scramble at least the portion of the message (e.g., one or more of chirp signal acknowledgement message 260, KA, one or more cell-specific reference signals 267, etc.) with the SIB request bitmap. This can allow a UE receiving the message to attempt to decode (e.g., descramble) the message based on the SIB request bitmap to determine whether the message corresponds to system information requests in the SIB request bitmap.

Optionally, at block 359, method 350 may include transmitting one or more subsequent transmissions, which may include the encoded message, in response to successfully decoding the at least one chirp signal. For example, in an aspect, base station 105 may operate one or more transmit chain components (e.g., modem 314, processor 312, transceiver 302, RF front end 288, and antennas 286, etc.) and/or chirp response message generator component 374 to transmit one or more of chirp signal acknowledgement message 260, or KA, (e.g., as the encoded message) to acknowledge receipt of the at least one chirp signal, and/or one or more cell-specific reference signals 267 (e.g., measurement reference signal (MRS), and/or cell-specific synchronization signal, PDCCH, PDSCH, etc.) that enable UEs 110 to determine a serving cell identifier of the cell of base station 105 with which UE 110 is communicating. In an aspect, base station 105 is triggered to transmit these one or more subsequent transmissions in response to successfully decoding at least one chirp signal 142. For instance, in an aspect, chirp response message generator component 374 may send a trigger signal to transceiver 302 (and/or to processor 312 and/or modem 314) along with chirp signal acknowledgement message 260, or KA, and/or one or more cell-specific reference signals 267 (and, optionally in some aspects, broadcast system information response message 147) in order to initiate the one or more subsequent transmissions. Alternatively, for example, transceiver 302 (and/or to processor 312 and/or modem 314) may include rules or functions to initiate the one or more subsequent transmissions in response to successfully decoding at least one chirp signal 142.

Optionally, at block 360, method 320 includes generating a broadcast system information response message that includes one or more requested system information in response to the one or more system information requests. For example, in an aspect, base station 105 may operate chirp response message generator component 374 and/or content determiner component 346 to generate broadcast system information response message 147 that includes one or more requested system information 149 in response to the one or more system information requests 143, where the one or more requested system information 149 correspond to the one or more system information requests 143. In an aspect, base station 105 may operate chirp response message generator component 374 and/or content determiner component 346 may determine to generate broadcast system information response message 147 based on chirp signal 142 including chirp purpose indicator 144 identifying a SIB-on-demand request and a broadcast response being expected by UE 110. For example, generating the broadcast system information response message may include generating one or more signals that include contents of one or more SIBs associated with the requested system information 149.

For example, in an aspect, base station 105 may operate chirp response message generator component 374 and/or content determiner component 346 to generate broadcast system information response message 147 that includes selected contents 348, which includes SIBs and/or data and/or parameters that relate to the one or more system information requests 143. Content determiner component 346 can include rules or functions to obtain or generate selected contents 348 based on identified system information requests 345, and optionally further based on chirp purpose indicator 144 and the identified one of the plurality of chirp purposes or function 285. For instance, selected contents 348 may depend on the exact system information being requested. Optionally, in some aspects, selected contents 348 may further depend on the identified format 344 of chirp purpose indicator 144 and further on the exact data contained within the contents of random access sequence 146 and/or chirp message 148, which in some aspects may be correlated to identified chirp purpose or function 285.

For instance, in the case of a system information request based on the operation of cell or zone selection, reselection, or handover, and chirp message 148 including one or more system information requests 143, such as in a SIB request bitmap, chirp response message generator component 374 may generate broadcast system information response message 147 with selected contents 348 including one or more sets of system information (e.g., one or more SIBs) useful for performing the actions at one or more UEs 110, e.g., operating one or more transmit and/or receive chain components (as described above) to establish and maintain a dedicated communication channel with base station 105 (e.g., UE 110 transitions from an RRC common mode to an RRC dedicated mode), and/or to perform intra-frequency and/or inter-frequency and/or inter-radio access technology measurements, or access a home eNode B (e.g., femtocell), or to obtain MBMS control information associated with one or more MBSFN areas, or perform any other function related to acquiring system information.

Moreover, in an aspect, the generating of broadcast system information response message 147 at block 360 may be based on receiving at least two chirp signals from at least two user equipments having matching system information requests, and determining to respond to the at least two chirp signals via the broadcast channel based on identifying the matching system information requests. For example, as noted above, system information request identifier component 343 may identify matching system information requests and notify chirp response message generator component 374 of the match. Accordingly, chirp response message generator component 374 may include rules or functions that operate to generate broadcast system information response message 147 in response to multiple received matching system information requests, e.g., to transmit a single response over a broadcast channel as opposed to transmitting a plurality of separate responses over separate unicast channels. For example, in this regard, chirp response message generator component 374 may ignore other requests for the same or similar system information. In other words, in an example, chirp response message generator component 374 may generate broadcast system information response message 147 even when the received chirp signals 142 have a format of a system information request associated with a unicast response (e.g., format 188 of FIG. 6, or format 214 or format 226 of FIG. 7). In one example, chirp response message generator component 374 may generate and transmit broadcast system information response message 147 in response to a first request, and can determine not to generate broadcast system information response messages 147 for similar requests that may be subsequently received as the UEs 110 transmitting subsequent similar requests may receive the broadcast system information response message 147 transmitted in response to the first request.

Additionally, in an aspect, the generating of broadcast system information response message 147 at block 360 may further include encoding at least a portion of broadcast system information response message 147 to define an encoded broadcast system information response message, where the encoding is a function of at least a portion of the at least one chirp signal. In particular, where the receiving the at least one chirp signal at block 352 (and/or block 354) includes receiving at least one SIB request bitmap that identifies one or more of a plurality of system information blocks corresponding to each of the one or more system information requests, the encoding may include encoding at least the portion of the chirp response message with the SIB request bitmap to define the encoded chirp response message. For example, in an aspect, chirp response message generator component 374 may include rules or functions that operate to encode at least a portion of broadcast system information response message 147 based on at least a portion of the at least one chirp signal 142 (e.g., based on SIB request bitmap of FIG. 3) using any encoding scheme or algorithm that may be known to both base station 105 and UE 110. Optionally, encoded broadcast system information response message 147 may be encoded with an encoding scheme that is based on or a function of a serving cell ID of base station 105, in addition to being encoded based on at least a portion of chirp signal 142, such as based on the one or more system information requests 143 (e.g., SIB request bitmap). Such encoding provides a level of security to broadcast system information response message 147, and basing the encoding on at least a portion of chirp signal 142 can enable a UE 110 transmitting a same or similar chirp signal 142 to decode the encoded broadcast system information response message 147 to obtain the requested system information 149.

Optionally, at block 362, method 350 includes transmitting, over a broadcast channel, the broadcast system information response message including the one or more requested system information in response to the chirp signal. For example, in an aspect, base station 105 may operate one or more transmit chain components (e.g., modem 314, processor 312, transceiver 302, RF front end 288, and antennas 286, etc.) to transmit broadcast system information response message 147, which may be encoded as described above, to UE 110 in response to chirp signal 142. As noted, broadcast system information response message 147 includes one or more requested system information 149, e.g., one or more SIBs, respectively corresponding to the one or more system information requests 143 of one or more chirp signals 142. In an aspect, base station 105 may operate chirp response message generator component 374 and/or content determiner component 346 and/or one or more transmit chain components to determine to transmit broadcast system information response message 147 via the broadcast channel based on chirp signal 142 including chirp purpose indicator 144 identifying a SIB-on-demand request and a broadcast response being expected by UE 110.

Thus, based on the operation of method 350, base station 105 may respond to at least one chirp signal 142 by sending broadcast system information response message 147 over a broadcast channel, accordingly making broadcast system information response message 147 accessible to a plurality of UEs 110 and saving network resources.

Additionally, referring to FIG. 12, base station 105 may include some components similar to those described above with respect to UE 110, such as antennas 286, RF front end 288, LNAs 290, switches 292, 294, and 300, filters 296, PAs 298, transceiver 302 including receiver 306 and transmitter 308, processors 312, modem 314, and memory 316. It should be noted that these components may operate in a similar manner as described above, however, these components on base station 105 operate to receive and process wireless RF signals from UE 110 (and/or other base stations 105) and to transmit wireless RF signals to UE 110 (and/or other base stations 105).

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of operating a base station for wireless communications, comprising:
   receiving, at the base station operating in a wireless communication network having a user-centric medium access control layer, at least one chirp signal having one or more system information requests from at least one user equipment, wherein the at least one chirp signal includes at least one system information block request bitmap that identifies one or more of a plurality of system information blocks corresponding to each of the one or more system information requests;
   identifying the one or more system information requests;
   generating a message in response to the one or more system information requests;
   scrambling at least a portion of the message as a function of the at least one system information block request bitmap, to define an encoded message; and
   transmitting, over a broadcast channel, the encoded message in response to the at least one chirp signal.

2. The method of claim 1, wherein the message includes a broadcast system information response message that includes one or more requested system information.

3. The method of claim 1, further comprising:
   generating a broadcast system information response message that includes one or more requested system information; and
   transmitting, over the broadcast channel and subsequent to the encoded message, the broadcast system information response message.

4. The method of claim 3, further comprising:
   wherein receiving the at least one chirp signal further comprises receiving at least one chirp signal with a chirp purpose indicator indicating a broadcast on-demand SIB request, or receiving at least two chirp signals from at least two user equipments having matching system information requests;
   determining to respond to the at least one chirp signal with the chirp purpose indicator indicating the broadcast on-demand SIB request via the broadcast channel based on the chirp purpose indicator, or determining to respond to the at least two chirp signals via the broadcast channel based on identifying the matching system information requests; and
   wherein transmitting the broadcast system information response message over the broadcast channel includes broadcasting the one or more requested system information corresponding to the one or more system information requests for the at least one chirp signal with the chirp purpose indicator indicating the broadcast on-demand SIB request, or corresponding to the matching system information requests for the matching system information requests.

5. The method of claim 4, further comprising:
   wherein receiving the at least two chirp signals having matching system information requests further comprises receiving at least a first chirp signal having a portion of a first user identification of a first user equipment and a second chirp signal having a portion of a second user identification of a second user equipment;
   identifying the portion of the first user identification of the first user equipment in the first chirp signal and the portion of the second user identification of the second user equipment in the second chirp signal as indicating a requested unicast response via a respective unicast channel; and
   wherein determining to respond to the at least two chirp signals via the broadcast channel includes determining to ignore the requested unicast response based on identifying the matching system information requests.

6. The method of claim 4, further comprising:
   wherein receiving the at least two chirp signals further comprises:
      receiving a first chirp signal having a first set of one or more system information requests from a first user equipment; and
      receiving a second chirp signal having a second set of one or more system information requests from a second user equipment;
   wherein the identifying further comprises identifying the first set of one or more system information requests and the second set of one or more system information requests;
   determining, based on the identifying of the first set and the second set, a matching subset of system information requests between the first set of one or more system information requests from the first user equipment and the second set of one or more system information requests from the second user equipment, wherein the matching subset of system information requests defines the matching system information requests; and
   wherein transmitting the broadcast system information response message over the broadcast channel includes broadcasting at least the one or more requested system information corresponding to the matching subset of system information requests.

7. The method of claim 4, further comprising:
   wherein receiving the at least two chirp signals further comprises:
      receiving a first chirp signal having a first set of one or more system information requests from a first user equipment; and
      receiving a second chirp signal having a second set of one or more system information requests from a second user equipment;
   wherein the identifying further comprises identifying the first set of one or more system information requests and the second set of one or more system information requests;
   determining, based on the identifying of the first set and the second set, that the first set of one or more system information requests and the second set of one or more system information requests are the matching system information requests; and
   wherein transmitting the broadcast system information response message over the broadcast channel includes broadcasting the one or more requested system information corresponding to the matching system information requests.

8. The method of claim 1, further comprising:
wherein the encoded message is a chirp signal acknowledgement message to acknowledge receipt of the at least one chirp signal; and
transmitting one or more subsequent transmissions in response to the transmitting of the chirp signal acknowledgement message, wherein the one or more subsequent transmissions include a serving cell identifier of the base station for decoding a broadcast system information response message over the broadcast channel.

9. The method of claim 8, wherein transmitting one or more subsequent transmissions further comprises transmitting one or more of a cell-specific reference signal transmission, a measurement reference signal transmission, a cell-specific synchronization signal transmission, a control channel transmission, or a data channel transmission.

10. The method of claim 1, further comprising:
wherein receiving the at least one chirp signal further comprises receiving a corresponding chirp purpose indicator;
identifying that the corresponding chirp purpose indicator indicates that the at least one chirp signal relates to a system information request-related chirp purpose, based on a format of the corresponding chirp purpose indicator; and
wherein identifying the one or more system information requests further comprise identifying one or more fields within the at least one chirp signal having the one or more system information requests based on the format of the corresponding chirp purpose indicator.

11. The method of claim 10, wherein receiving the corresponding chirp purpose indicator further comprises receiving a corresponding random access sequence or a corresponding chirp message having the corresponding chirp purpose indicator.

12. The method of claim 1, wherein receiving the at least one chirp signal further comprises receiving a corresponding chirp message containing the one or more system information requests.

13. An apparatus for wireless communications, comprising:
a transceiver configured to receive at least one chirp signal having one or more system information requests from at least one user equipment, wherein the transceiver is operating in a wireless communication network having a user-centric medium access control layer;
a memory having one or more instructions;
a processor in communication with the memory and the transceiver, wherein the processor is configured to:
receive, via the transceiver, the at least one chirp signal having one or more system information requests from at least one user equipment, wherein the at least one chirp signal includes at least one system information block request bitmap that identifies one or more of a plurality of system information blocks corresponding to each of the one or more system information requests;
identify the one or more system information requests;
generate a message in response to the one or more system information requests;
scramble at least a portion of the message as a function of the at least one system information block request bitmap, to define an encoded message; and
transmitting, via the transceiver, over a broadcast channel, the encoded message in response to the at least one chirp signal.

14. The apparatus of claim 13, wherein the message includes a broadcast system information response message that includes one or more requested system information.

15. The apparatus of claim 13, wherein the processor is further configured to:
generate a broadcast system information response message that includes one or more requested system information; and
transmit, over the broadcast channel and subsequent to the encoded message, the broadcast system information response message.

16. The apparatus of claim 15, wherein the processor is configured to receive the at least one chirp signal with a chirp purpose indicator indicating a broadcast on-demand SIB request, or receive at least two chirp signals from at least two user equipments having matching system information requests, and is further configured to:
determine to respond to the at least one chirp signal with the chirp purpose indicator indicating the broadcast on-demand SIB request via the broadcast channel based on the chirp purpose indicator, or determine to respond to the at least two chirp signals via the broadcast channel based on identifying the matching system information requests; and wherein the processor is configured to transmit the broadcast system information response message over the broadcast channel includes broadcasting the one or more requested system information corresponding to the one or more system information requests for the at least one chirp signal with the chirp purpose indicator indicating the broadcast on-demand SIB request, or corresponding to the matching system information requests for the matching system information requests.

17. A method of a user equipment to communicate with a network entity, comprising:
detecting, by the user equipment operating in a wireless communication network having a user-centric medium access control layer, presence of a trigger event to request one or more sets of system information;
generating a chirp signal that includes one or more system information requests corresponding to the trigger event to request one or more sets of system information, wherein the chirp signal includes at least one system information block request bitmap that identifies one or more of a plurality of system information blocks corresponding to each of the one or more system information requests;
transmitting the chirp signal to a base station;
receiving, via a broadcast channel, an encoded message in response to the chirp signal; and
decoding the encoded message as a function of the at least one system information block request bitmap.

18. The method of claim 17, wherein the encoded message is a broadcast system information response message including one or more requested system information corresponding to the one or more system information requests.

19. The method of claim 17, further comprising:
receiving a broadcast system information response message including one or more requested system information corresponding to the one or more system information requests.

20. The method of claim 19, further comprising:
wherein the broadcast system information response message is encoded; and decoding the encoded broadcast system information response message using a decoding scheme that is a function of at least a portion of the chirp signal to obtain the one or more requested system information.

21. The method of claim 19, further comprising:
wherein the encoded message is a chirp signal acknowledgement message to acknowledge receipt of the chirp signal;
receiving one or more subsequent transmissions that enable the user equipment to determine a serving cell identifier of the base station, wherein the user equipment is triggered to receive the one or more subsequent transmissions in response to the receiving of the chirp signal acknowledgement message; and
decoding the broadcast system information response message using the serving cell identifier to obtain the one or more requested system information.

22. The method of claim 21, wherein receiving one or more subsequent transmissions further comprises receiving one or more of a cell-specific reference signal, a measurement reference signal, a cell-specific synchronization signal, a control channel transmission, or a data channel transmission.

23. The method of claim 17, further comprising:
wherein transmitting the chirp signal further comprises transmitting the chirp signal with a chirp purpose indicator indicating a broadcast on-demand SIB request.

24. The method of claim 17, wherein generating the chirp signal further comprises generating the chirp signal to include a portion of an identifier of the user equipment to indicate a requested unicast response via a respective unicast channel.

25. The method of claim 17, wherein generating the chirp signal further comprises generating the chirp signal to include a chirp purpose indicator that indicates that the chirp signal relates to a system information request-related chirp purpose.

26. The method of claim 25, wherein generating the chirp signal further comprises generating the chirp signal to include one or both of a random access sequence or a chirp message having the chirp purpose indicator.

27. The method of claim 17, wherein generating the chirp signal further comprises generating the chirp signal to include a chirp message having the one or more system information requests.

28. An apparatus for wireless communications, comprising:
a transceiver having a receiver and a transmitter respectively for receiving and transmitting wireless signals in a wireless communication network having a user-centric medium access control layer;
a memory having one or more instructions;
a processor in communication with the memory and the transceiver, wherein the processor is configured to:
detect presence of a trigger event to request one or more sets of system information;
generate a chirp signal that includes one or more system information requests corresponding to the trigger event to request one or more sets of system information, wherein the chirp signal includes at least one system information block request bitmap that identifies one or more of a plurality of system information blocks corresponding to each of the one or more system information requests;
transmit, via the transceiver, the chirp signal to a base station;
receive, via the transceiver over a broadcast channel, an encoded message in response to the chirp signal; and
decode the encoded message as a function of the at least one system information block request bitmap.

29. The apparatus of claim 28, wherein the encoded message is a broadcast system information response message including one or more requested system information corresponding to the one or more system information requests.

30. The apparatus of claim 28, wherein the processor is further configured to:
receive a broadcast system information response message including one or more requested system information corresponding to the one or more system information requests.

* * * * *